(12) United States Patent
Kim et al.

(10) Patent No.: US 6,839,476 B2
(45) Date of Patent: Jan. 4, 2005

(54) MULTI-LAYER PRINTED CIRCUIT BOARD AND THE METHOD FOR COUPLING OPTICAL SIGNALS BETWEEN LAYERS OF MULTI-LAYER PRINTED CIRCUIT BOARD

(75) Inventors: Young-Woo Kim, Chungchungnam-do (KR); Byoung-Ho Rhee, Daejeon (KR); Dek-Gin Yang, Chungchungbuk-do (KR); Young-Sang Cho, Chungju-si (KR); Kyu-Hyok Yim, Chungchungbuk-do (KR)

(73) Assignee: Samsung Electro-Mechanics Co., Ltd., Kyunggki-Do (KR)

(*) Notice: Subject to any disclaimer, the term of this patent is extended or adjusted under 35 U.S.C. 154(b) by 0 days.

(21) Appl. No.: 10/417,357

(22) Filed: Apr. 16, 2003

(65) Prior Publication Data

US 2004/0109628 A1 Jun. 10, 2004

(30) Foreign Application Priority Data

Dec. 10, 2002 (KR) ........................................ 2002-78438

(51) Int. Cl.$^7$ ................................................ G02B 6/12
(52) U.S. Cl. ............................ 385/14; 385/53; 385/88; 385/129; 385/130; 385/131; 385/36
(58) Field of Search ............................ 385/14, 31, 129, 385/130, 131, 88, 92, 53, 36, 132

(56) References Cited

U.S. PATENT DOCUMENTS

| | | | | |
|---|---|---|---|---|
| 4,465,333 A | * | 8/1984 | Caserta et al. | 385/73 |
| 6,257,771 B1 | * | 7/2001 | Okayasu | 385/89 |
| 6,390,690 B1 | * | 5/2002 | Meis et al. | 385/88 |
| 6,600,853 B2 | * | 7/2003 | Wickman et al. | 385/24 |
| 6,623,177 B1 | * | 9/2003 | Chilton | 385/88 |
| 2003/0128933 A1 | * | 7/2003 | Bona et al. | 385/50 |
| 2003/0219217 A1 | * | 11/2003 | Wickman et al. | 385/89 |

FOREIGN PATENT DOCUMENTS

KR 2001-113289 7/2001

* cited by examiner

*Primary Examiner*—Brian M. Healy
(74) *Attorney, Agent, or Firm*—Gottlieb, Rackman & Reisman, P.C.

(57) ABSTRACT

Disclosed herein is an optical signal coupling block, and a multi-layer printed circuit board and the method for coupling optical signals between layers of a multi-layer printed circuit board (PCB) using optical signal coupling blocks. The optical signals between the layers are coupled through the steps of forming a plurality of optical via holes in the multi-layer PCB to which optical waveguides for transmitting optical signals are attached; inserting the optical signal coupling blocks into the plural optical via holes such that the optical signal coupling blocks are connected to the optical waveguides to transmit the optical signals; forming at least one connection part to couple optical signals between the optical waveguides and the optical signal coupling blocks; and interconnecting the optical waveguides and the optical signal coupling blocks by aligning positions of the optical waveguides and the optical signal coupling blocks.

74 Claims, 24 Drawing Sheets

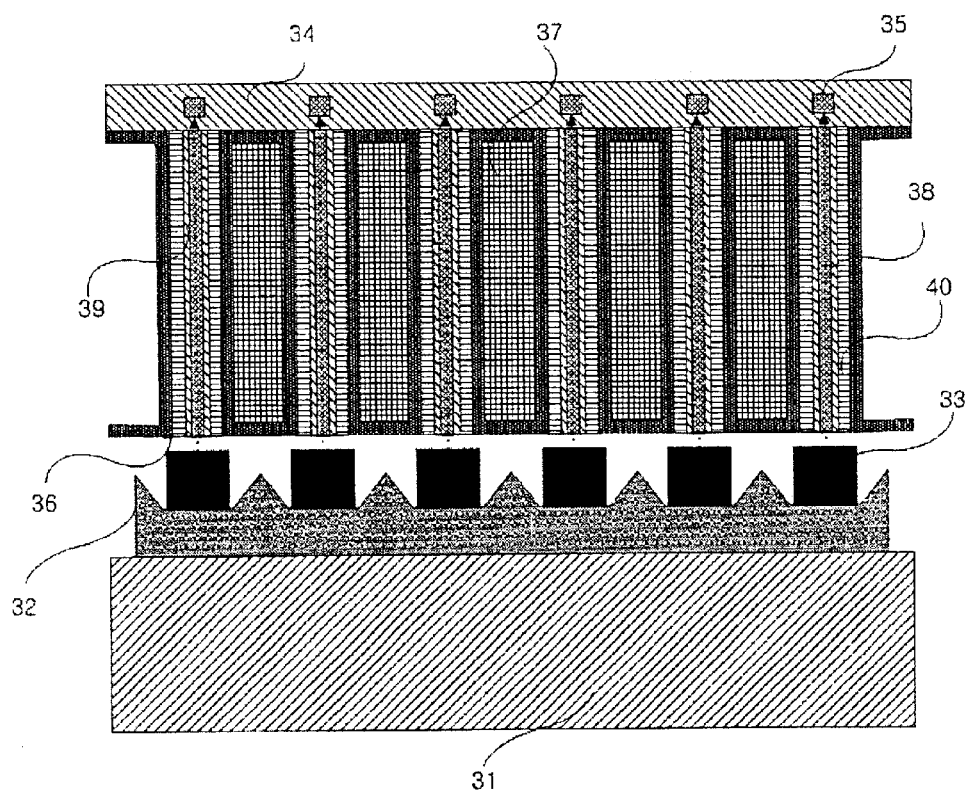

D-1

D-2
D-3

D-4

D-5

MULTI-LAYER PRINTED CIRCUIT BOARD AND THE METHOD FOR COUPLING OPTICAL SIGNALS BETWEEN LAYERS OF MULTI-LAYER PRINTED CIRCUIT BOARD

BACKGROUND OF THE INVENTION

1. Field of the Invention

The present invention relates generally to an optical signal coupling block, and a multi-layer printed circuit board and method for coupling optical signals between layers of the multi-layer printed circuit board using the same, and more particularly to a method for coupling optical signals between layers of a multi-layer printed circuit board by optically interconnecting optical waveguides to optical fibers using fiber or pipe blocks having grooves of certain shapes where plastic optical fibers are inserted.

2. Description of the Prior Art

Generally, a Printed Circuit Board (PCB) is a circuit board fabricated by densely mounting a plurality of components on a plate made of phenol resin or epoxy resin and densely forming curtailed circuits on the surface of the plate to connect the respective components to each other. Such a PCB is manufactured by placing a conductive film, such as a copper film, on one surface of a phenol or epoxy resin insulation plate, forming circuit patterns through (whereby the copper film is then corroded away except for the line-shaped circuits), and forming holes to allow electrical components to be mounted on the insulating plate.

PCBs are classified into single-sided PCBs, double-sided PCBs and multi-layer PCBs according to the number of circuit pattern surfaces. As the number of layers of a PCB increases, the capacity to mount components thereon increases greatly, so PCBs having many layers are applied to high precision products. A multi-layer PCB designates a PCB having three or more layers including a surface conductive pattern. The conductive patterns are formed on the respective layers of the PCB while being separated from each other by insulation materials provided between the respective layers.

On the other hand, in the prior art, circuit patterns are formed on a copper plate (through a patterning process) at the time of manufacturing a PCB to form inner and outer layers of the PCB. Recently, one or more optical waveguides capable of transmitting and receiving signals via light through the use of polymer materials and glass fibers are inserted into a PCB, which is called an Electro-Optical Circuit Board (EOCB). Such an EOCB is a PCB in which one or more optical waveguides and one or more glass plates are inserted into a base board on which copper circuit patterns are formed; so electrical and optical signals are used together, thus performing super-high speed data communication in the same board through optical signal interfacing, and converting the optical signals into electrical signals in each mounted device so as to store data and process signals.

Currently, several coupling methods have been proposed for coupling optical signals between respective layers of a multi-layer PCB. Generally, a direct writing method, a beam reflection method, a method using a reflection mirror, and a direct coupling method are employed as methods of coupling optical signals between multi-channel layers.

Hereinafter, an example of an optical interface in a conventional PCB is described with reference to FIG. 1.

FIG. 1 shows a conventional beam coupling technology using a beam reflecting micro mirror.

Referring to FIG. 1, if an electrical signal is input from a processor board 2, the electrical signal is converted into an optical signal by a laser diode 1 in a transmission module 3 mounted on a PCB, and the optical signal is radiated. Thereafter, the radiated optical signal passes through lenses 8a and 8b on the left side of FIG. 1 and is reflected by a micro mirror 4a inserted into the PCB and depicted on the right side of FIG. 1. The reflected optical signal passes through an optical waveguide and is then reflected by a reflection mirror 4b on the right side of FIG. 1. Thereafter, the reflected optical signal is transmitted to a photodiode 6 in a reception module 7 through lenses 8c and 8d on the left side of FIG. 1. In the optical waveguide, the optical signal is transferred through its multi-mode polymer cores 5a and 5b with low loss. A waveguide cladding 9 is formed above and under the cores 5a and 5b. Consequently, an electrical signal transmitted from the processor board 2 on the left side of FIG. 1 is converted into an optical signal and transmitted. Thereafter, the optical signal is again converted into an electrical signal and then transmitted to a processor board on the left side of FIG. 1.

A conventional multi-layer PCB for coupling optical signals is described with reference to FIGS. 2a and 2b.

FIGS. 2a and 2b are front and side sectional views of the conventional multi-layer PCB for coupling optical signals, respectively. Referring to FIGS. 2a and 2b, the conventional multi-layer PCB employs a manner in which, if light is emitted from each Vertical-Cavity Surface-Emitting Laser (VCSEL) 13, that is, a light source device, a micro lens 17 concentrates the light and transmits the concentrated light to an optical waveguide 14 and 15 through PCB optical via holes 16. At this time, signal coupling between respective layers is performed in the same manner as described above. In this case, a Silicon Optical Bench (SiOB) 12 is formed on a PCB 11, wherein the SiOB is a term generally designating silicon wafers. Instead of the SiOB 12, a polymer board can be used. The optical waveguide typically includes a cladding 14 and a core 15, and functions to transfer light received from the VCSEL 13 through the micro lens 17. Thereafter, an optical signal 19 is transferred to an optical waveguide of another layer. In this case, each of the optical via holes 16 is insulated with an insulation material 18. Further, a micro lens 17' can be inserted into each of the optical via holes 16 so as to more reliably transmit the optical signal.

The VCSEL 13 designates a light source used in an optical module that transmits and amplifies optical source data using a manner in which circular laser beams are emitted perpendicularly to the surface of a board. So far Light Emitting Diodes (LEDs) and edge emitting Laser Diodes (LDs) have been generally used. However, Surface-Emitting Lasers (SELs) developed in the 1990s have been gaining popularity as light sources, replacing LEDs and edge emitting LDs. Such VCSELs are used in optical fiber communications, interfacing, large capacity information parallel processing, etc.

However, the conventional multi-layer PCB using the optical via holes 16 to transmit the optical signal 19 is problematic in that the micro lens 17 must be used, and the wavelength of an optical signal that can be transmitted through the conventional multi-layer PCB is limited to 200 μm.

Further, in the prior art, many coupling methods for waveguides using curved surface reflection mirrors or prisms have been proposed. However, theses coupling methods are problematic in that it is difficult to insert reflection mirrors or prisms into base boards and attach the mirrors or prisms to the base boards, and alignment errors may occur between the reflection mirrors or prisms and the base boards when respective layers are processed in a single line using several mechanical drills to couple multi-channel signals in cases where a multi-layer PCB is manufactured.

SUMMARY OF THE INVENTION

Accordingly, the present invention has been made keeping in mind the above problems occurring in the prior art, and an object of the present invention is to provide an optical signal coupling block, and a multi-layer PCB and method for coupling optical signals between layers of the multi-layer PCB using the same, which can improve alignment characteristics and easily couple optical signals between layers.

Another object of the present invention is to provide an optical signal coupling block, and a multi-layer PCB and method for coupling optical signals between layers of the multi-layer printed circuit board using the same, which can prevent an alignment error occurring when respective layers are processed in a line using several mechanical drills so as to couple multi-channel signals in the case where the multi-layer PCB is manufactured.

A further object of the present invention is to provide a multi-layer printed circuit board, which can transmit an optical signal over a longer distance without using a conventional micro lens.

In order to accomplish the above object, the present invention provides a method for coupling optical signals between layers of a multi-layer printed circuit board (PCB) using optical signal coupling blocks, comprising the steps of forming a plurality of optical via holes in the multi-layer PCB to which optical waveguides for transmitting optical signals are attached; inserting the optical signal coupling blocks into the plural optical via holes such that the optical signal coupling blocks are connected to the optical waveguides to transmit the optical signals; forming at least one connection part to couple optical signals between the optical waveguides and the optical signal coupling blocks; and interconnecting the optical waveguides and the optical signal coupling blocks by aligning positions of the optical waveguides and the optical signal coupling blocks.

Preferably, the connection part is constructed such that a surface cut at an angle of 45° is formed thereon, thus enabling the optical waveguides and the optical signal coupling blocks to be interconnected in an "L" or an inverted and reversed "L" shape through the cut surface. Further, a reflection mirror can be attached to the connection part.

Preferably, the optical signal coupling blocks are fiber blocks each comprising a lower block provided with a plurality of grooves formed at regular intervals and each having a certain shape; and a plurality of optical signal coupling members inserted into the plural grooves. In addition, the certain shape is a "V" shape.

Preferably, each of the fiber blocks may comprise an upper block formed on the optical signal coupling members.

Preferably, the optical signal coupling blocks are pipe blocks each comprising an under-cladding formed of a medium for optical waveguides; a core defining a plurality of grooves formed in a pipe shape at regular intervals on the under-cladding; a plurality of optical signal coupling members inserted into the plural grooves; and an over-cladding formed on the optical signal coupling members.

Preferably, the optical signal coupling blocks are constructed such that their optical signal input terminals are arranged within a distance of 60 µm from Vertical-Cavity Surface-Emitting Lasers (VCSELs), so that VCSELs radiate light to the optical signal coupling blocks.

Preferably, the optical signal coupling members may be optical fibers or optical waveguides.

Preferably, the surface cut at an angle of 45° is polished.

Preferably, the connection part is constructed such that each of the optical waveguides is cut at an angle of 45°, and each of the optical signal coupling blocks is cut at an angle of 90° so as to interconnect the optical waveguides and the optical signal coupling blocks through optical signals.

Preferably, the optical signal coupling method comprise the step of adhering the optical signal coupling blocks to the multi-layer PCB using epoxy so as to fix the optical signal coupling blocks to the multi-layer PCB after the aligning of positions is performed.

In addition, the present invention provides a method for interconnecting optical signal coupling blocks and optical waveguides, comprising the steps of inserting optical signal coupling members into two optical signal coupling blocks which will be interconnected through optical signals; etching one of the two optical signal coupling blocks at an angle of 45°; polishing the portion etched at an angle of 45°; joining the two optical signal coupling blocks together to form an L-shaped optical signal coupling block; and connecting the L-shaped optical signal coupling block to each of the optical waveguides by aligning positions of the L-shaped optical signal coupling block and the optical waveguide such that the L-shaped optical signal coupling block is interconnected to the optical waveguide through optical signals.

Preferably, a reflection mirror is attached to said polished portion.

Preferably, the method for interconnecting optical signal coupling blocks and optical waveguides may further comprise the step of adhering the L-shaped optical signal coupling block to a multi-layer PCB using epoxy so as to fix the L-shaped optical signal coupling block to the multi-layer PCB after the aligning of positions is performed.

Preferably, the optical signal coupling members are optical fibers or optical waveguides.

In addition, the present invention provides a method for interconnecting optical signal coupling blocks and optical waveguides, comprising the steps of a) inserting optical signal coupling members into at least one optical signal coupling block in which V-shaped grooves are formed in only a lower block; b) cutting each of the optical waveguides at an angle of 90° and cutting the optical signal coupling block at an angle of 45° such that the optical waveguide and the optical signal coupling block are interconnected through optical signals; c) polishing a surface formed by cutting the optical signal coupling block at an angle of 45° to form a reflection surface; and d) aligning positions of the optical waveguide and the optical signal coupling block.

Preferably, a reflection mirror is attached to said reflection surface.

Preferably, the method for interconnecting optical signal coupling blocks and optical waveguides may further comprise the step of adhering the optical signal coupling block to a multi-layer PCB using epoxy so as to fix the optical signal coupling block to the multi-layer PCB after the aligning of positions is performed.

Preferably, the optical signal coupling members are optical fibers or optical waveguides.

Preferably, the reflection mirror is a micro mirror coated with silver (Ag) or aluminum (Al).

Preferably, the step a) may comprise the steps of forming the plural V-shaped grooves by, etching a silicon wafer;

inserting the optical signal coupling members into the V-shaped grooves; and forming a groove at a surface of the silicon wafer which is opposite to a surface in which the V-shaped grooves are formed, wherein the reflection surface of 45° is formed on the opposite surface.

Preferably, the step b) is performed such that the optical signal coupling block is cut at an angle of 45° using a diamond blade.

In addition, the present invention provides a method for interconnecting optical signal coupling blocks and optical waveguides, comprising the steps of a) inserting optical signal coupling members into at least one optical signal coupling block in which V-shaped grooves are formed in only a lower block; b) cutting each of the optical waveguides at an angle of 45° and cutting the optical signal coupling block at an angle of 90° such that the optical waveguide and the optical signal coupling block are interconnected through optical signals; c) polishing a surface formed by cutting the optical waveguide at an angle of 45° to form a reflection surface; and d) aligning positions of the optical waveguide and the optical signal coupling block.

Preferably, the optical signal coupling block is adhered to a multi-layer PCB such that the optical signal coupling members inserted into the V-shaped grooves in the lower block come into contact with a surface of each of optical via holes in the multi-layer PCB.

Preferably, the optical signal coupling block is adhered to a multi-layer PCB such that the lower block comes into contact with a surface of each of optical via holes in the multi-layer PCB.

In addition, the present invention provides a method for forming optical waveguide devices in an optical signal coupling block, comprising the steps of a) forming a groove by etching a silicon wafer of the optical signal coupling block; b) inserting optical waveguide devices into the groove and adhering the optical waveguide devices to the silicon wafer using epoxy resin; c) cutting edge portions of the silicon wafer, protruded from surfaces of the inserted optical waveguide devices; and d) cutting end portions of the optical waveguide devices at an angle of 45° according to an optical signal coupling direction.

Preferably, if the optical signal coupling direction is a direction from the optical waveguide devices to the silicon wafer, the end portions of the optical waveguide devices are cut using a diamond blade approaching from the silicon wafer side.

Preferably, if the optical signal coupling direction is a direction from the silicon wafer to the optical waveguide devices, the silicon wafer is etched to form a groove and then the end portions of the optical waveguide devices are cut using a diamond blade approaching from the optical waveguide devices side.

Preferably, the epoxy resin is ultraviolet (UV) curable epoxy resin.

In addition, the present invention provides a printed circuit board (PCB) for coupling optical signals between layers using optical signal coupling blocks, comprising a base board having a plurality of optical via holes; a plurality of optical waveguides mounted on the base board to transmit optical signals; a plurality of optical signal coupling blocks inserted into the plural optical via holes and connected to the plural optical waveguides to transmit optical signals; and at least one connection part for interconnecting the optical waveguides and the optical signal coupling blocks.

Preferably, the connection part is constructed such that a surface cut at an angle of 45° is formed thereon, thus enabling the optical waveguides and the optical signal coupling blocks to be interconnected in an "L" or an inverted and reversed "L" shape through the cut surface. Further, a reflection mirror may be attached to the connection part.

Preferably, the optical signal coupling blocks are fiber blocks each comprising a lower block provided with a plurality of grooves formed at regular intervals and each having a certain shape; and a plurality of optical signal coupling members inserted into the plural grooves.

Preferably, the certain shape is a "V" shape.

Preferably, each of the fiber blocks further comprises an upper block formed on the optical signal coupling members.

Preferably, the optical signal coupling blocks are pipe blocks each comprising an under-cladding formed of a medium for optical waveguides; a core defining a plurality of grooves formed in a pipe shape at regular intervals on the under-cladding; a plurality of optical signal coupling members inserted into the plural grooves; and an over-cladding formed on the optical signal coupling members.

Preferably, the optical signal coupling blocks are constructed such that their optical signal input terminals are arranged within a distance of 60 $\mu$m from Vertical-Cavity Surface-Emitting Lasers (VCSELs), so the VCSELs radiate light to the optical signal coupling blocks.

Preferably, the optical signal coupling members are optical fibers or optical waveguides.

Preferably, the surface cut at an angle of 45° is polished.

Preferably, the connection part is constructed such that each of the optical waveguides is cut at an angle of 45°, and each of the optical signal coupling blocks is cut at an angle of 90° so as to interconnect the optical waveguides and the optical signal coupling blocks through optical signals.

Preferably, the optical signal coupling blocks are adhered to the printed circuit board using epoxy so as to fix the optical signal coupling blocks to the printed circuit board after the aligning of positions is performed.

In addition, the present invention provides a printed circuit board (PCB) for coupling optical signals between layers using optical signal coupling blocks, comprising a base board having a plurality of optical via holes; a plurality of optical waveguides mounted on to the base board to transmit optical signals; and a plurality of optical signal coupling blocks each having a plurality of optical signal coupling members inserted thereinto such that the optical signal coupling blocks and the optical waveguides are interconnected through optical signals, wherein each of the optical signal coupling blocks is comprised of two optical signal coupling blocks joined together in an "L" (elbow) shape, any of two optical signal coupling blocks being etched at an angle of 45° and polished.

In addition, the present invention provides a printed circuit board for coupling optical signals between layers using optical signal coupling blocks, comprising a base board having a plurality of optical via holes; a plurality of optical waveguides mounted on the base board to transmit optical signals; and a plurality of optical signal coupling blocks each having a plurality of V-shaped grooves formed only in a lower block, wherein each of the optical waveguides is cut at an angle of 90° and each of the optical signal coupling blocks is cut at an angle of 45° such that the optical waveguides and the optical signal coupling blocks are interconnected through optical signals, and a surface formed by cutting each of the optical signal coupling blocks at an angle of 45° is polished to form a reflection surface.

In addition, the present invention provides a printed circuit board for coupling optical signals between layers using optical signal coupling blocks, comprising a base board having a plurality of optical via holes; a plurality of optical waveguides mounted on the base board to transmit optical signals; and a plurality of optical signal coupling blocks each having a plurality of V-shaped grooves formed only in a lower block, wherein each of the optical waveguides is cut at an angle of 45° and each of the optical signal coupling blocks is cut at an angle of 90° such that the optical waveguides and the optical signal coupling blocks are interconnected through optical signals, and a surface formed by cutting each of the optical waveguides at an angle of 45° is polished to form a reflection surface.

In addition, the present invention provides an optical signal coupling block, comprising a lower block in which a plurality of grooves each having a certain shape are formed at regular intervals; and a plurality of optical signal coupling members inserted into the plural grooves.

Preferably, the certain shape is a "V" shape, and the V-shaped grooves are formed by laser ion etching.

Preferably, the lower block is a silicon wafer.

Preferably, the optical signal coupling members are optical fibers, and the optical fibers are plastic optical fibers.

Preferably, the optical signal coupling members are optical waveguides.

Preferably, the optical signal coupling block may further comprise an upper block formed on the optical signal coupling members. Further, the upper block is made of Pyrax glass having a light transmissivity equal to or greater than 95%, or a polymer.

Preferably, the upper block has the same grooves as those in the lower block.

Preferably, the optical signal coupling members are cut at an angle of 45 or 90°, such that the optical signal coupling block and an optical waveguide are interconnected in an "L" or an inverted and reversed "L" shape.

In addition, the present invention provides an optical signal coupling block, comprising an under-cladding formed of a medium for optical waveguides; a core defining a plurality of grooves formed in a certain shape at regular intervals on the under-cladding; a plurality of optical signal coupling members inserted into the plural grooves; and an over-cladding formed on the optical signal coupling members.

Preferably, the certain shape is a pipe shape.

Preferably, the core is made of a polymer and functions as a guide for supporting the optical signal coupling members.

Preferably, the plural grooves may be formed by laser ion etching.

Preferably, the optical signal coupling members are optical fibers, and the optical fibers are plastic optical fibers.

Preferably, the over-cladding may be made of Pyrax glass having a light transmissivity equal to or greater than 95%, or a polymer.

Preferably, the optical signal coupling members are cut at an angle of 45 or 90°, such that the optical signal coupling block and an optical waveguide are interconnected in an "L" or an inverted and reversed "L" shape.

Therefore, in order to couple optical signals between layers in the case where an optical PCB is formed in multiple layers, the present invention is constructed such that Plastic Optical Fibers (POFs) are inserted into fiber blocks or pipe blocks having grooves formed in a predetermined shape, and the fiber blocks or pipe blocks are inserted into optical via holes or cavities in the PCB. Therefore, optical waveguides and optical fibers are connected to each other through optical signals, thus enabling optical signals between respective layers of the multi-layer PCB to be stably coupled.

BRIEF DESCRIPTION OF THE DRAWINGS

The above and other objects, features and other advantages of the present invention will be more clearly understood from the following detailed description taken in conjunction with the accompanying drawings, in which:

FIGS. 3a and 3b are front and side sectional views of a multi-layer PCB into which optical fibers are inserted using fiber blocks or pipe blocks to couple optical signals according to the present invention;

DESCRIPTION OF THE PREFERRED EMBODIMENTS

Hereinafter, a multi-layer Printed Circuit Board (PCB) for coupling optical signals between layers using fiber blocks or pipe blocks, and coupling method thereof according to embodiments of the present invention, will be described in detail with reference to the attached drawings.

First, a method for coupling optical signals between layers of the multi-layer PCB using blocks for optical signal coupling according to the present invention is described.

Figure 1:
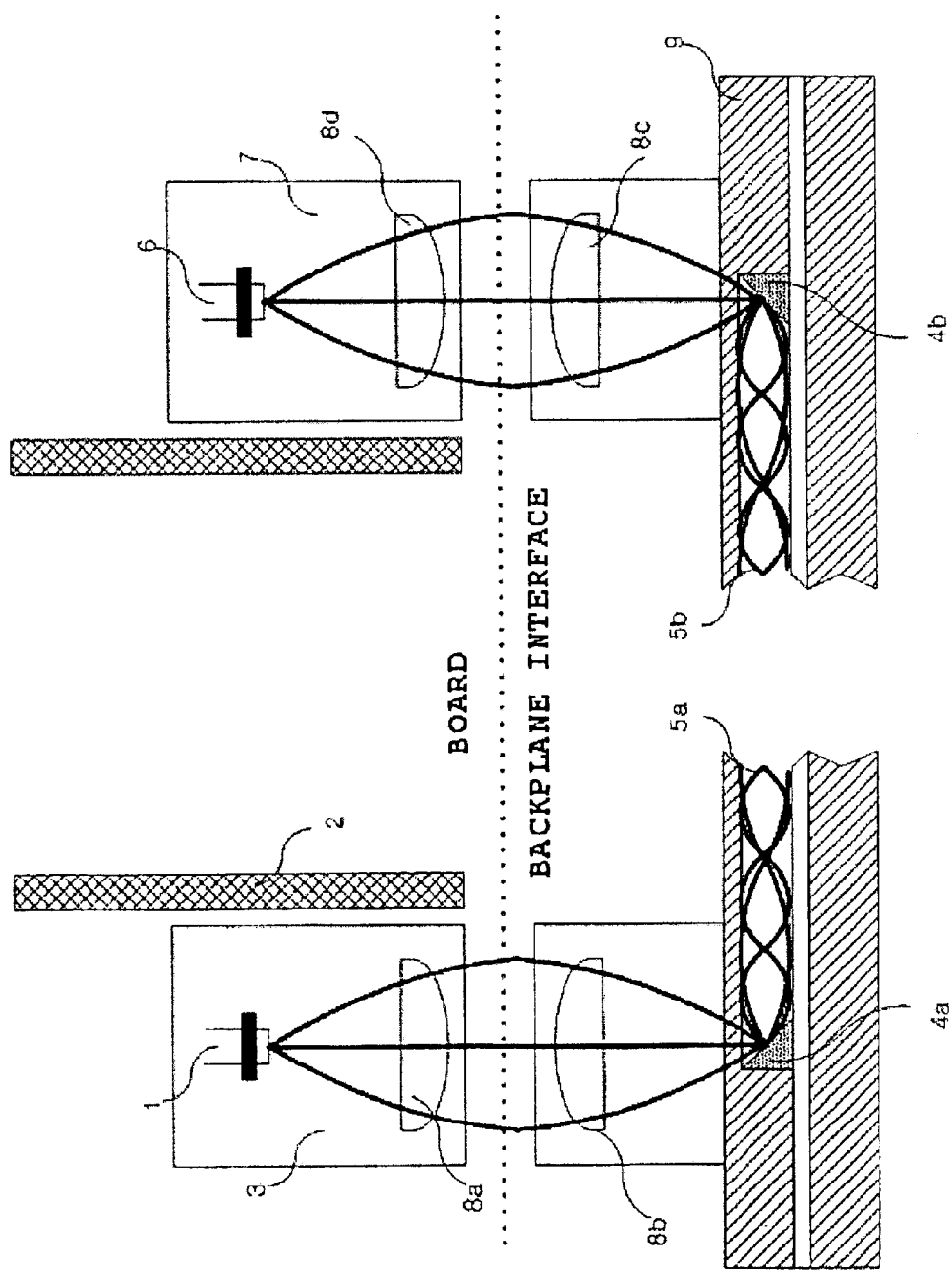
FIG. 1 is a view showing an example of an optical interface in the prior art.
Figure 2A:
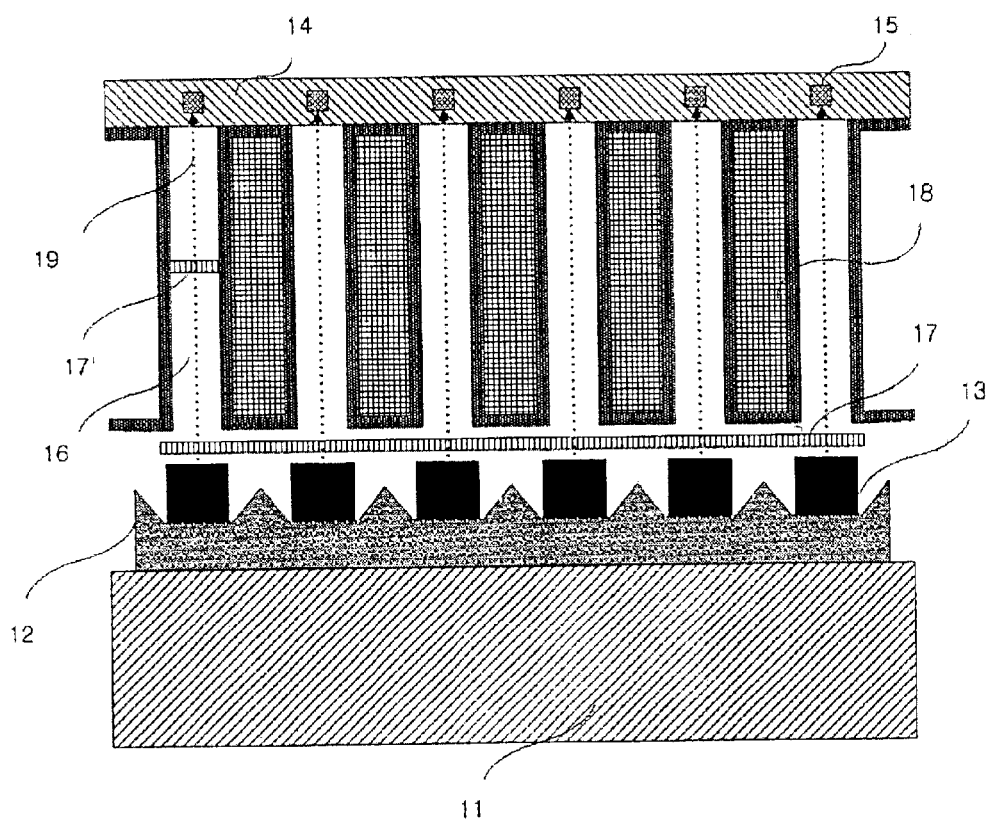
FIGS. 2a and 2b are front and side sectional views of a conventional multi-layer PCB for coupling optical signals.
Figure 2B:
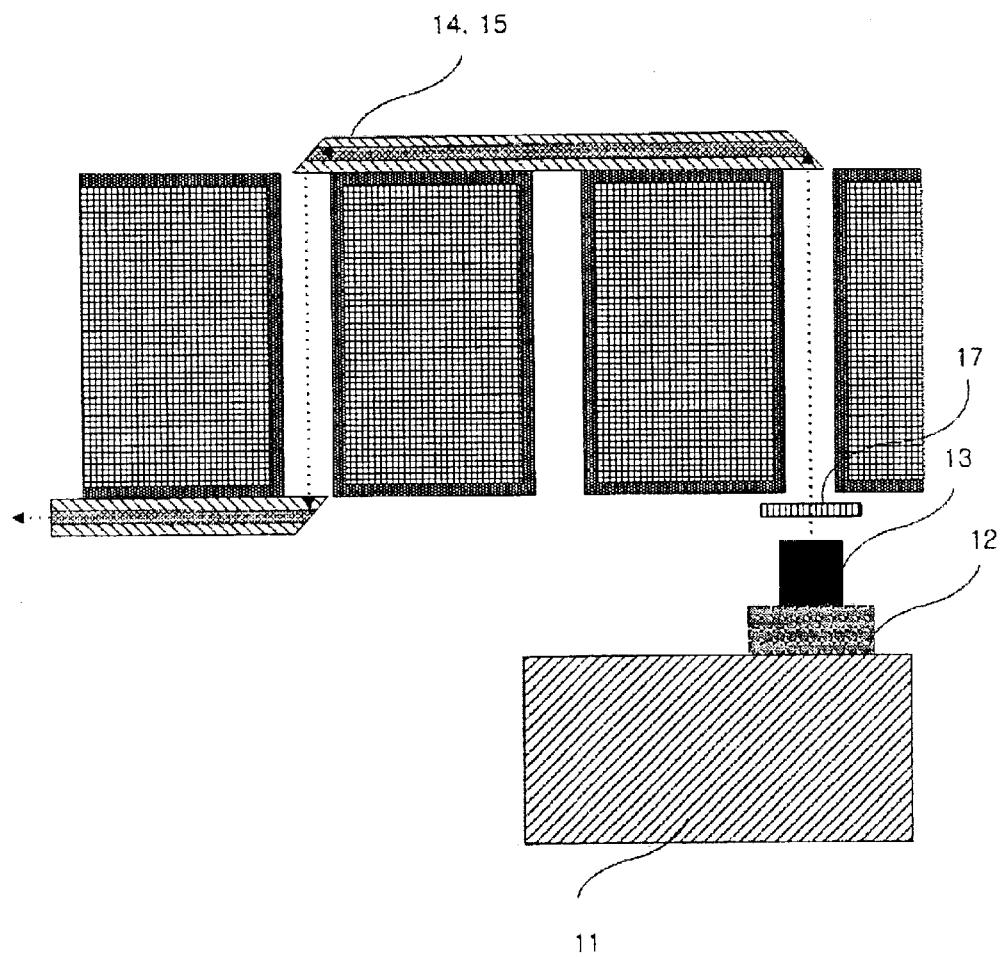
Figure 3B:
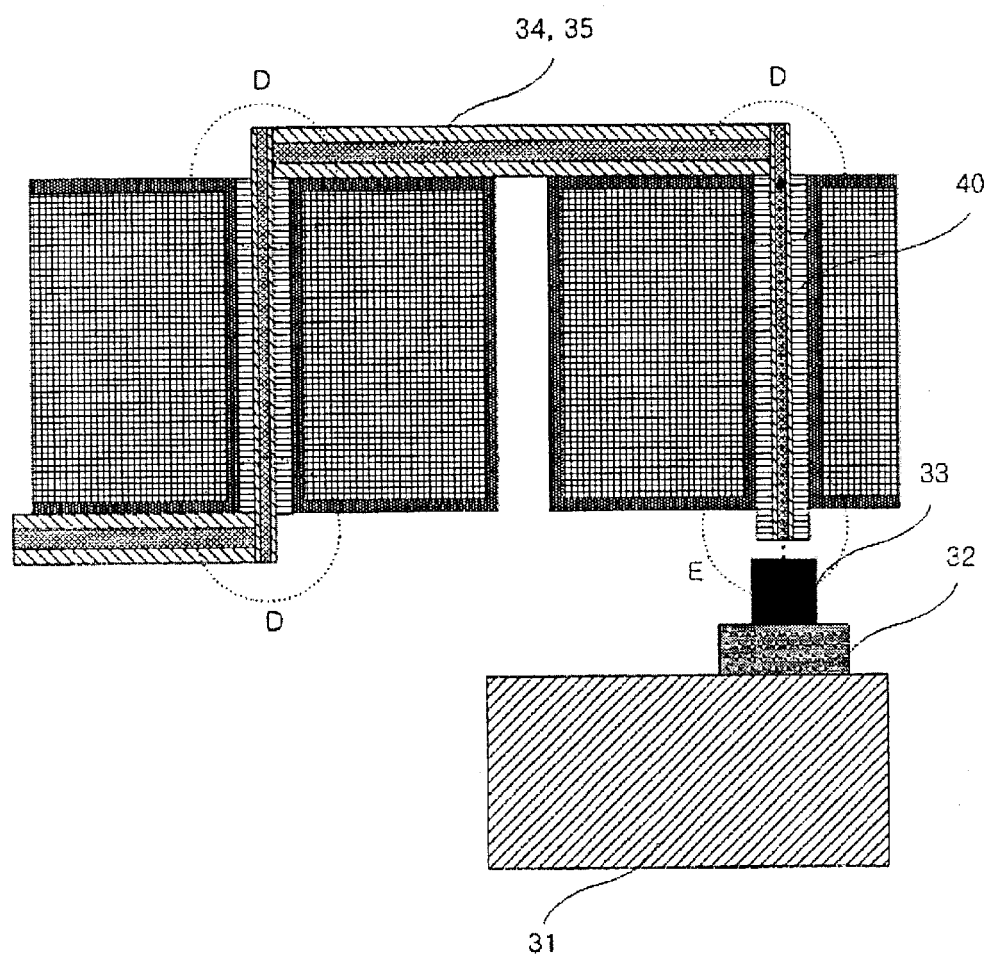

FIGS. 3a and 3b are front and side sectional views of a multi-layer PCB into which optical fibers are inserted using fiber blocks or pipe blocks to couple optical signals according to the present invention.

Referring to FIGS. 3a and 3b, the present invention is operated such that, if light is emitted from VCSELs 33, which are light sources, light is transmitted to optical waveguides 34 and 35 through optical fibers 39 in fiber blocks or pipe blocks 40 inserted into optical via holes 36. At this time, optical signal coupling between respective layers is also achieved in the same manner as the above light transmission process. In this case, SiOB 32 is formed on a PCB 31. Each of optical waveguides typically consists of a cladding 34 and a core 35, and allows light transmitted from the VCSELs 33 to be transferred along the optical fibers 39 in the fiber blocks or pipe blocks 40. Thereafter, optical signals 38 are transferred to optical waveguides of another layer. In this case, optical via holes 36 of respective PCB layers are insulated with insulation materials 37 provided between PCB layers. It should be noted that a lens is necessary for a conventional multi-layer PCB, but not necessary for the multi-layer PCB of the present invention, because light is directly transferred along the optical fibers 39. However, an optical signal input terminal of each of the fiber blocks for optical signal coupling is arranged within a distance of 60 μm from the VCSEL 33, so the VCSELs 33 radiate light onto the fiber blocks or pipe blocks 40.

According to the present invention, the multi-layer PCB for coupling optical signals between layers uses the fiber blocks or pipe blocks 40 to allow optical signals between layers to be coupled with the optical waveguide 34 and 35. Therefore, in the method of coupling optical signals between layers of the multi-layer PCB using the optical signal coupling blocks of the present invention, the plural optical via holes 36 are formed in the multi-layer PCB, and optical signal coupling fiber blocks 40 are inserted into the optical via holes 36. Thereafter, a reflection mirror or a surface cut at 45° is formed so as to interconnect the optical waveguide 34 and 35 mounted on the multi-layer PCB and the optical signal coupling fiber blocks 40. After that, the positions of the optical waveguide 34 and 35 and the optical signal coupling fiber blocks 40 are aligned to be interconnected.

In this case, the reflection mirror can be a micro mirror coated with silver Ag or aluminum Al.

In this case, the optical signal coupling fiber blocks can be replaced with pipe blocks.

Therefore, the optical via holes or cavities are formed in the PCB to allow the fiber blocks 40 or the pipe blocks to be inserted thereinto. After that, the optical waveguide 34 and 35 and the optical fibers 39 are attached to each other in a corresponding layer, which is laminated in a build-up manner to construct layers for coupling optical signals.

In FIG. 3b, a part designated by a reference character "E" represents that light is received from the VCSELs 33 without a conventional lens. Further, connecting methods of parts designated by a reference character "D" will be described in detail later using several embodiments with reference to FIGS. 6 to 14.

Meanwhile, the fiber blocks of the present invention are described with reference to FIGS. 4a to 4c, and the pipe blocks thereof are described with reference to FIG. 5.

Figure 4A:
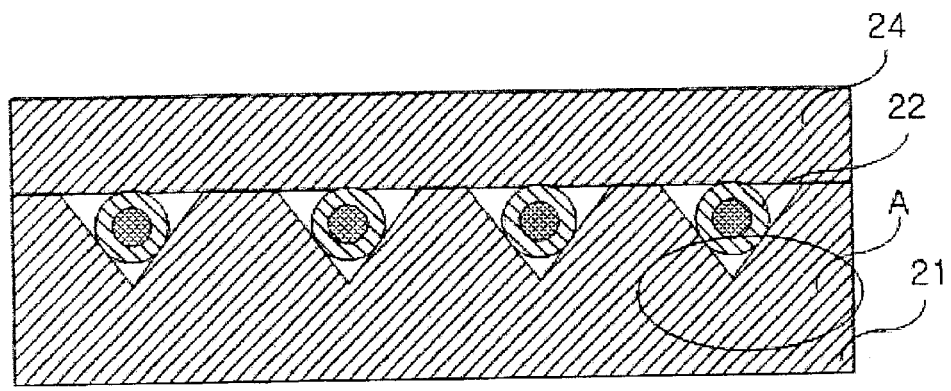
FIGS. 4a to 4c are sectional views showing several fiber blocks having V-shaped grooves for optical signal coupling according to the present invention.
Figure 4B:
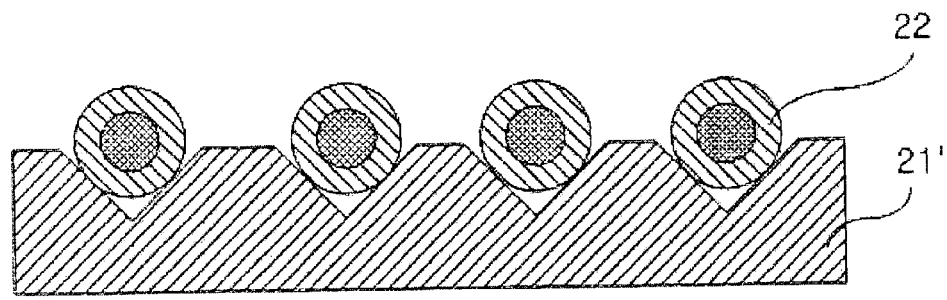
Figure 4C:
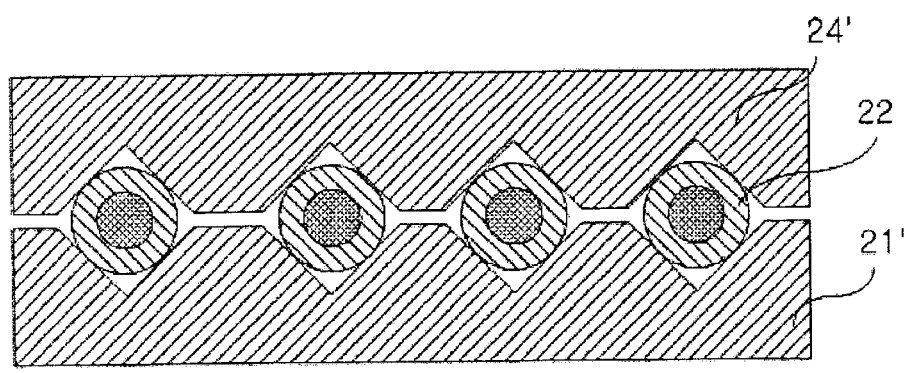

FIG. 4a is a sectional view showing an optical signal coupling fiber block, which has V-shaped grooves in its lower portion and does not have grooves in its upper portion, FIG. 4b is a sectional view showing a fiber block having V-shaped grooves in only its lower portion, and FIG. 4c is a sectional view showing a fiber block having V-shaped grooves in both its lower and upper portions.

Referring to FIG. 4a, when the optical signal coupling fiber block according to the embodiment is interconnected to the optical waveguide to couple optical signals between layers of the multi-layer PCB, the optical signal coupling fiber block can be constructed by comprising a lower block 21 provided with a plurality of V-shaped grooves formed therein at regular intervals, optical fibers 22 inserted into the V-shaped grooves, and an upper block 24 placed on the optical fibers 22.

The lower block 21 is made of a silicon wafer or polymer, and the V-shaped grooves "A" can be formed by laser ion etching.

Further, glass fibers can be used as the optical fibers 22, which are preferably plastic optical fibers (POFs). On the other hand, the optical fibers 22 can be replaced with optical waveguides, which will be described in detail.

The upper block 22 is made of Pyrax glass having a light transmissivity equal to or greater than 95%, or a polymer.

Further, referring to FIG. 4b, the fiber block can be formed using only a lower block 21' without an upper block shown in FIG. 4c.

Referring to FIG. 4c, an upper block 24' can be constructed such that grooves identical with the V-shaped grooves formed in the lower block 21' are formed therein.

Each of the optical fibers 22 is cut at an angle of either 45° or 90°, so it can be interconnected to the optical waveguide in an "L" or an inverted and reversed "L" shape.

Accordingly, in the fiber block of the present invention, the V-shaped grooves "A" are formed in the silicon (Si) wafer 21 to allow the optical fibers 22 to be inserted thereinto, so the fiber block functions as a medium for connecting the optical fibers 22 to the optical waveguide.

Figure 5:
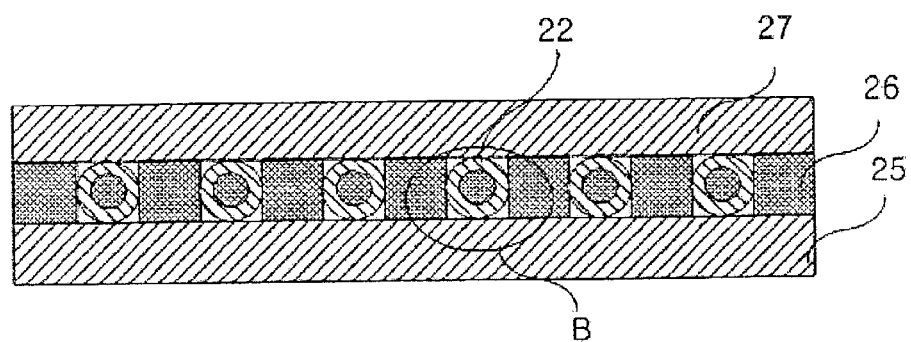
FIG. 5 is a sectional view of a pipe block for optical signal coupling according to the present invention.

FIG. 5 is a sectional view of an optical signal coupling pipe block.

Referring to FIG. 5, the optical signal coupling pipe block of the present invention is constructed by comprising an under-cladding 25 made of a medium for optical waveguides, a core 26 defining a plurality of grooves formed in the shape of a pipe "B" at regular intervals on the under-cladding 25, a plurality of optical fibers 22 inserted into the plural grooves, and an over-cladding 27 formed on the optical fibers 22.

The core 26 is formed of a polymer, and only functions as a guide without the transmission of light. That is, the core 26 is not a medium for transmitting light, but a guide for supporting the optical fibers 22 so as to guide light transmission. The core 26, the under-cladding 25 and the over-cladding 27 are laid over one another to form the plural pipes "B". The optical fibers 22 are inserted into the pipe block.

In this case, the plural grooves can be formed through a laser ion etching process.

Further, the optical fibers 22 can be glass fibers, and are preferably plastic optical fibers (POFs).

The over-cladding 27 is made of Pyrax glass having a light transmissivity equal to or greater than 95%, or a polymer material.

Each of the optical fibers 22 is cut at an angle of either 45° or 90°, so it can be connected to the optical waveguide in an "L" or an inverted and reversed "L" shape.

That is, in the optical signal coupling block of the present invention shown in FIGS. 4a to 4c and FIG. 5, "V"-shaped grooves are formed in a polymer or Si wafer 21, with one end of each of the optical fibers 22 being cut at an angle of either 45° or 90° and with the other end thereof being cut at an angle of either 90° or 45°. Accordingly, the optical signal coupling fiber and pipe blocks are manufactured to be interconnected to optical waveguides in an "L" or an inverted and reversed "L" shape, so they can be interconnected to allow different layers of the multi-layer PCB to freely exchange optical signals therebetween.

Hereinafter, with reference to respective embodiments, there is described a method for interconnecting the optical signal coupling blocks and the optical waveguides of the multi-layer PCB in the case that optical signals between layers of the multi-layer PCB are coupled using the optical signal coupling blocks in the multi-layer PCB according to the present invention.

With respect to first to seventh embodiments, reference numerals 41, 42 and 43 designate an insulation material of the PCB, a cladding of an optical waveguide, and a core of the optical waveguide, respectively. Further, reference numerals 45 and 44 designate a radiated light ray and an optical fiber, respectively. Moreover, reference numerals 46 and 47 designate upper and lower blocks, and reference numerals 48 and 49 designate a reflection mirror and a surface cut at an angle of 45°.

First Embodiment

Figure 6:
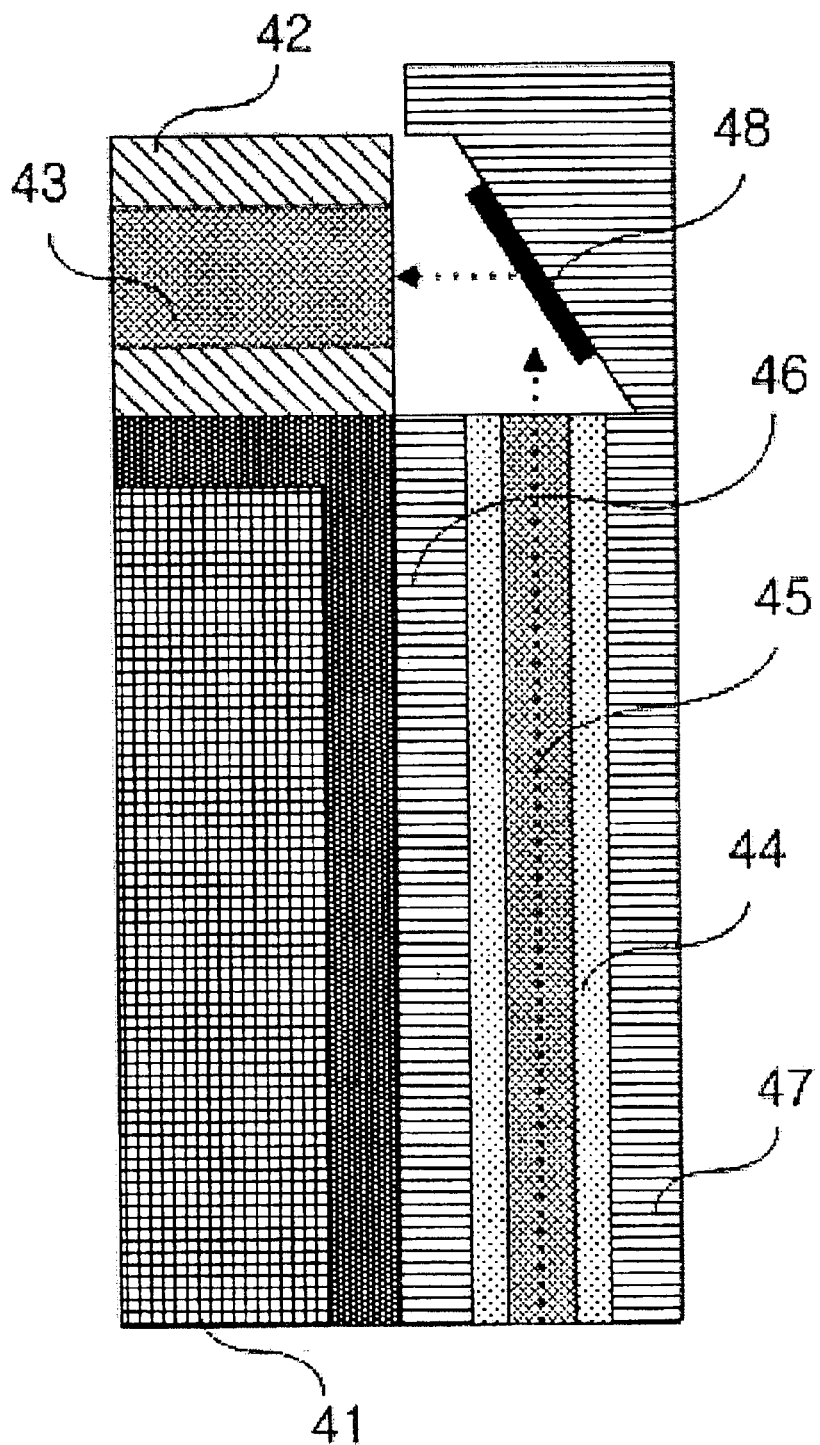
FIG. 6 is a sectional view of a multi-layer PCB in which an optical waveguide and an optical signal coupling block are interconnected using a beam reflection coupling method according to a first embodiment of the present invention.

FIG. 6 is a sectional view of a multi-layer PCB in which the optical waveguide and the optical signal coupling block are interconnected using a beam reflection coupling method according to a first embodiment of the present invention.

Referring to FIG. 6, the optical fiber 44 is inserted into the optical signal coupling fiber block, the part of the optical fiber 44 connected to the optical waveguide is etched at an angle of 45°, and a reflection mirror 48 is attached to the part etched at 45°. Thereafter, the positions of the optical waveguide 42 and 43 and the optical signal coupling fiber block to which the reflection mirror 48 is attached are aligned.

In this case, an optical signal input terminal of the optical signal coupling fiber block is arranged within a distance of 60 μm from the VCSEL, such that the VCSEL radiates light into the optical signal coupling fiber block.

Further, the optical signal coupling fiber block can be replaced with the pipe block, and the optical fiber can be a glass fiber and replaced with an optical waveguide.

Second Embodiment

Figure 7:
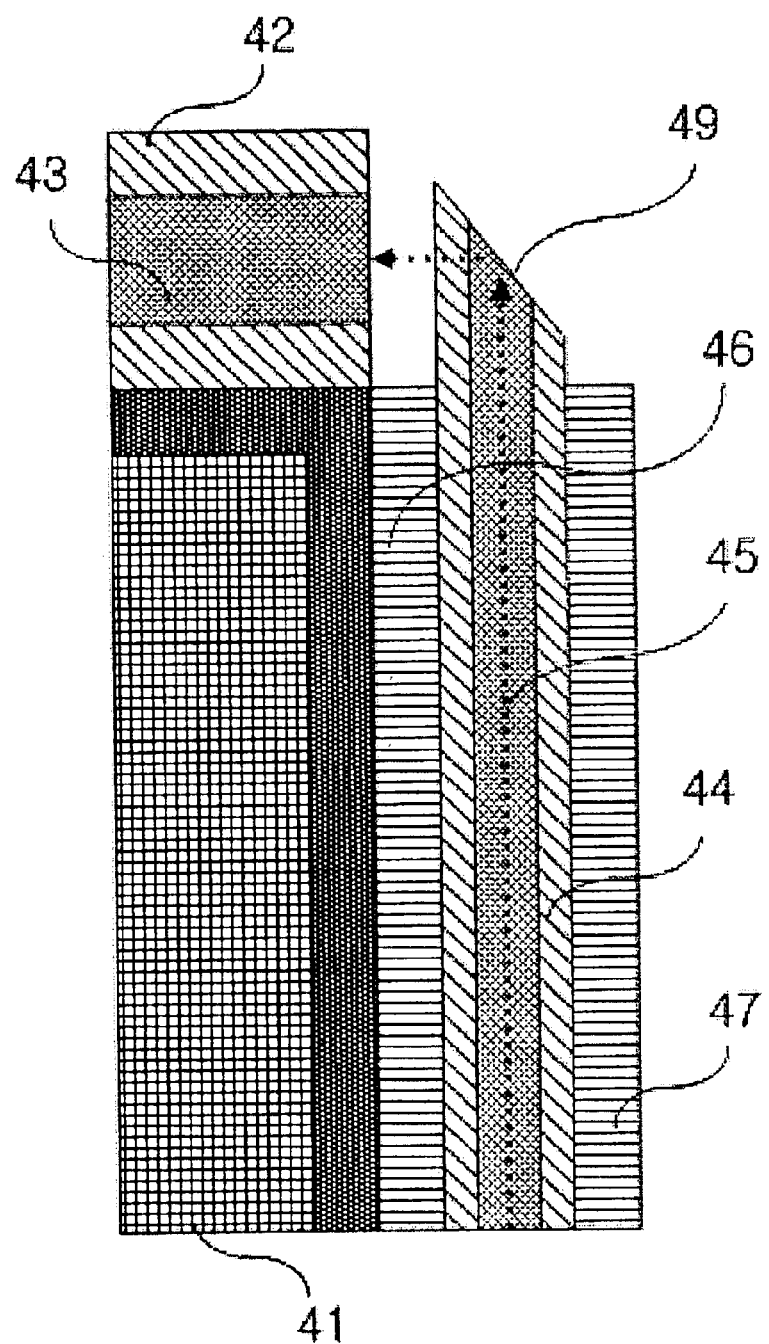
FIG. 7 is a sectional view of a multi-layer PCB in which the optical waveguide and the optical signal coupling block are interconnected using a direct writing method(?) according to a second embodiment of the present invention.

FIG. 7 is a sectional view of a multi-layer PCB in which the optical waveguide and the optical signal coupling block are interconnected using a direct writing method(?) according to a second embodiment of the present invention.

Referring to FIG. 7, in the second embodiment of the present invention, the optical fiber 44 is inserted into the optical signal coupling fiber block, the part of the optical fiber 44 connected to the optical waveguide 42 and 43 is cut at an angle of 45°, and a surface 49 cut at an angle of 45° is polished to form a reflection surface. In this case, the polishing of the cut surface represents an operation of smoothening the cut surface so as to increase its reflectivity. Thereafter, the positions of the optical waveguide 42 and 43 and the optical signal coupling fiber block are aligned. Compared with the conventional multi-layer PCB in which the positions of the optical waveguide and the optical signal coupling block are aligned together with those of a micro lens and optical via holes, the present invention is advantageous in that, since the optical signal coupling block is inserted into each of optical via holes in advance, position alignment can be easily performed.

In this case, a micro mirror, which is a reflection mirror, can be attached to the reflection surface. The reason for attaching the reflection mirror after the reflection surface is formed is to increase light transmission efficiency. At this time, the reflection mirror can be a micro mirror coated with silver Ag or aluminum Al.

Further, an optical signal input terminal of the optical signal coupling fiber block is arranged within a distance of 60 μm from the VCSEL, such that the VCSEL radiates light into the optical fiber 44 of the optical signal coupling fiber block.

Further, the optical signal coupling fiber block can be replaced with the pipe block, and the optical fiber can be a glass fiber and replaced with an optical waveguide.

Third Embodiment

Figure 8:
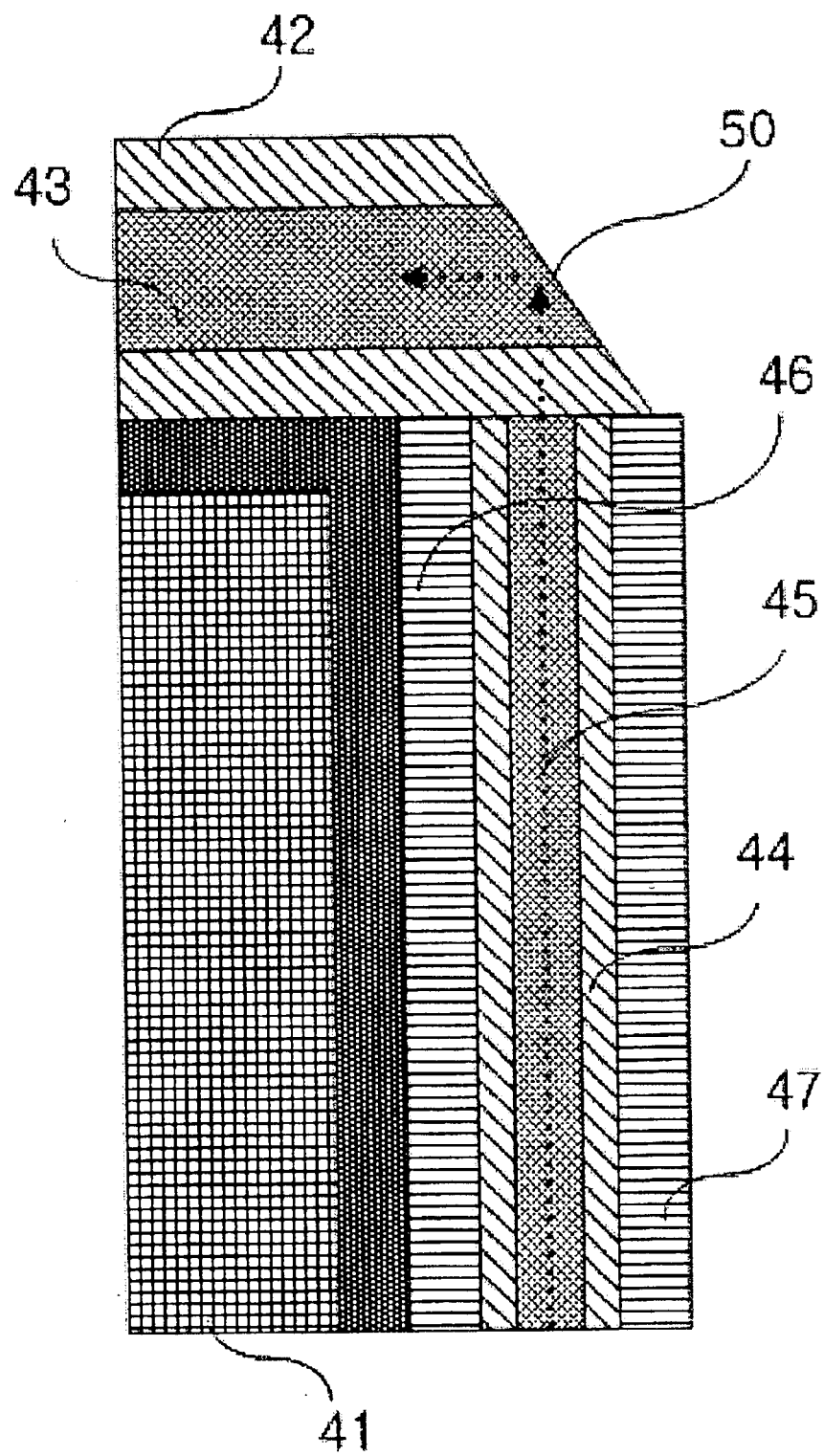
FIG. 8 is a sectional view of a multi-layer PCB in which the optical waveguide and the optical signal coupling block are interconnected using the beam reflection coupling method according to a third embodiment of the present invention.

FIG. 8 is a sectional view of a multi-layer PCB in which the optical waveguide and the optical signal coupling block are interconnected using the beam reflection coupling method according to a third embodiment of the present invention.

Referring to FIG. 8, in the method for connecting the optical signal coupling fiber block to the optical waveguide of the multi-layer PCB according to the third embodiment of the present invention, the optical fiber 44 is inserted into the optical signal coupling fiber block, the optical waveguide 42 and 43 is cut at an angle of 45°, and the optical signal coupling fiber block is cut at an angle of 90°. Further, a surface formed by cutting the optical waveguide 42 and 43 at an angle of 45° is polished to form a reflection surface. A micro lens, which is the reflection mirror 48, can be attached to the reflection surface. The reason for attaching the reflection mirror 48 after the reflection surface is formed is to increase light transmission efficiency. At this time, the reflection mirror 48 can be a micro mirror coated with silver Ag or aluminum Al.

Thereafter, the positions of the optical waveguide 42 and 43 and the optical signal coupling fiber block are aligned.

Further, in order to fix the optical signal coupling fiber block to a side of the PCB insulation material 41, the fiber block can be adhered to the PCB insulation material 41 using epoxy after the position alignment is carried out.

Moreover, the optical signal coupling fiber block can be replaced with the pipe block, and the optical fiber can be a glass fiber and replaced with an optical waveguide.

Fourth Embodiment

Figure 9:
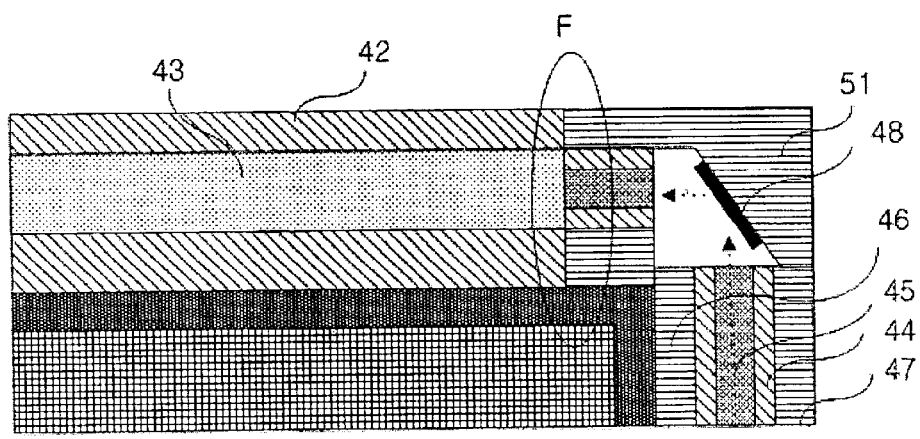
FIG. 9 is a sectional view of a multi-layer PCB in which in which the optical waveguide and an L-shaped (elbow) optical signal coupling block are interconnected using the beam reflection coupling method according to a fourth embodiment of the present invention.

FIG. 9 is a sectional view of a multi-layer PCB in which the optical waveguide and an L-shaped (elbow) optical signal coupling block are interconnected using the beam reflection coupling method according to a fourth embodiment of the present invention.

Figure 10A:
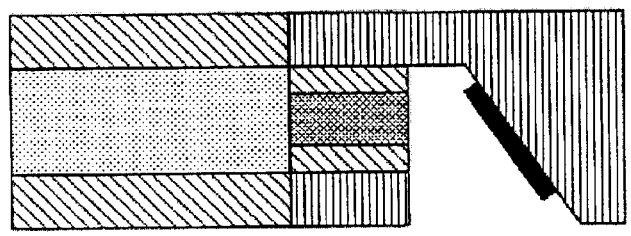
FIGS. 10a and 10b are views showing examples of a method of interconnecting and adhering the L-shaped (elbow) block to the optical waveguide and the multi-layer PCB when the multi-layer PCB of FIG. 9 is manufactured.
Figure 10A:
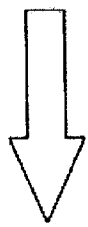
Figure 10A:
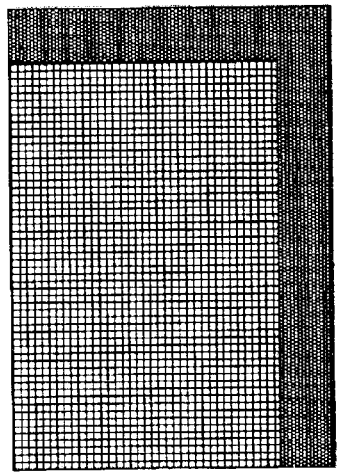
Figure 10A:
Figure 10A:
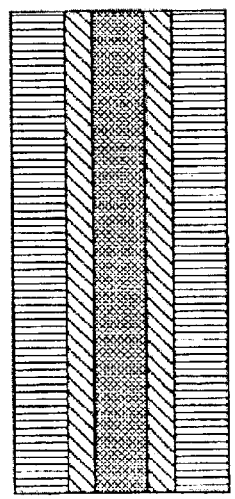
Figure 10B:
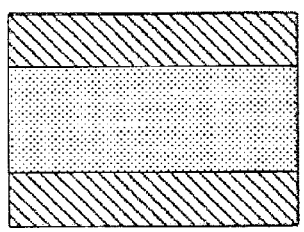
Figure 10B:
Figure 10B:
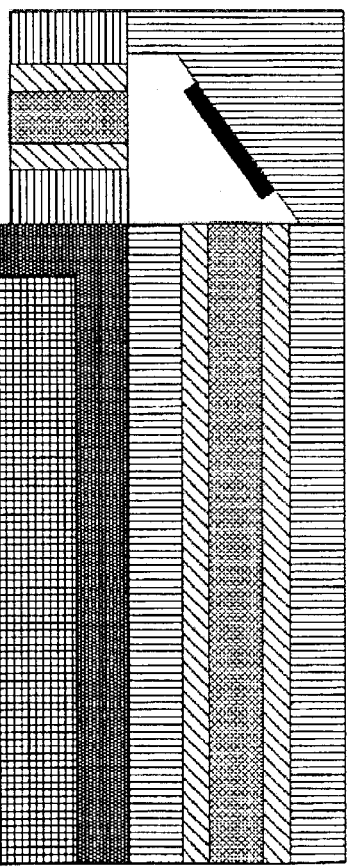

FIGS. 10a and 10b are views showing a method of interconnecting and adhering the L-shaped (elbow) optical signal coupling fiber block to the optical waveguide and the multi-layer PCB when the multi-layer PCB of FIG. 9 is manufactured.

Referring to FIG. 9 and FIGS. 10a and 10b, in the method of interconnecting the optical signal coupling fiber block to the optical waveguide of the multi-layer PCB according to the fourth embodiment of the present invention, a part of the optical signal block is placed between the optical waveguide and the L-shaped (elbow) optical signal coupling block 51.

The optical fiber 44 is inserted into each of two optical signal coupling blocks, that is, the optical signal coupling block inserted into the optical via hole and the optical signal coupling block connected to the optical waveguide. Further, one of the two optical signal coupling blocks is etched at an angle of 45°, and the reflection mirror 48 is attached to a portion etched at an angle of 45°. Alternatively, as shown in FIG. 7, one of the optical fibers in the two optical signal coupling blocks is cut at an angle of 45°, so the two optical fibers can be connected to each other. Thereafter, the two optical signal coupling blocks are aligned to form the L-shaped (elbow) optical coupling block 51. Further, the optical waveguide 42 and 43 and the L-shaped (elbow) optical fiber coupling block 51 formed through the above process are aligned in their positions and then adhered to the PCB insulation material. The reference character "F" in FIG. 9 shows an example in which the optical waveguide 42 and 43 is interconnected to the L-shaped optical signal coupling block 51. In this case, one block of the L-shaped optical signal coupling block 51, which is connected to the optical waveguide, is manufactured separately from the other block thereof.

Referring to FIGS. 10a and 10b, FIG. 10a shows that D-1 representing one of the two blocks, and D-3 representing the other thereof are adhered to D-2 representing the PCB. In this case, D-1 shows that one block is attached to the optical waveguide 42 and 43 in advance. FIG. 10b shows that the optical waveguide 42 and 43 is attached to a structure D-5 in which the two optical signal coupling blocks are connected to each other.

In this case, in order to fix the optical signal coupling blocks to a side of the PCB insulation material, the optical signal coupling blocks are aligned in their positions and then adhered to the PCB insulation material using epoxy.

Fifth Embodiment

Figure 11:
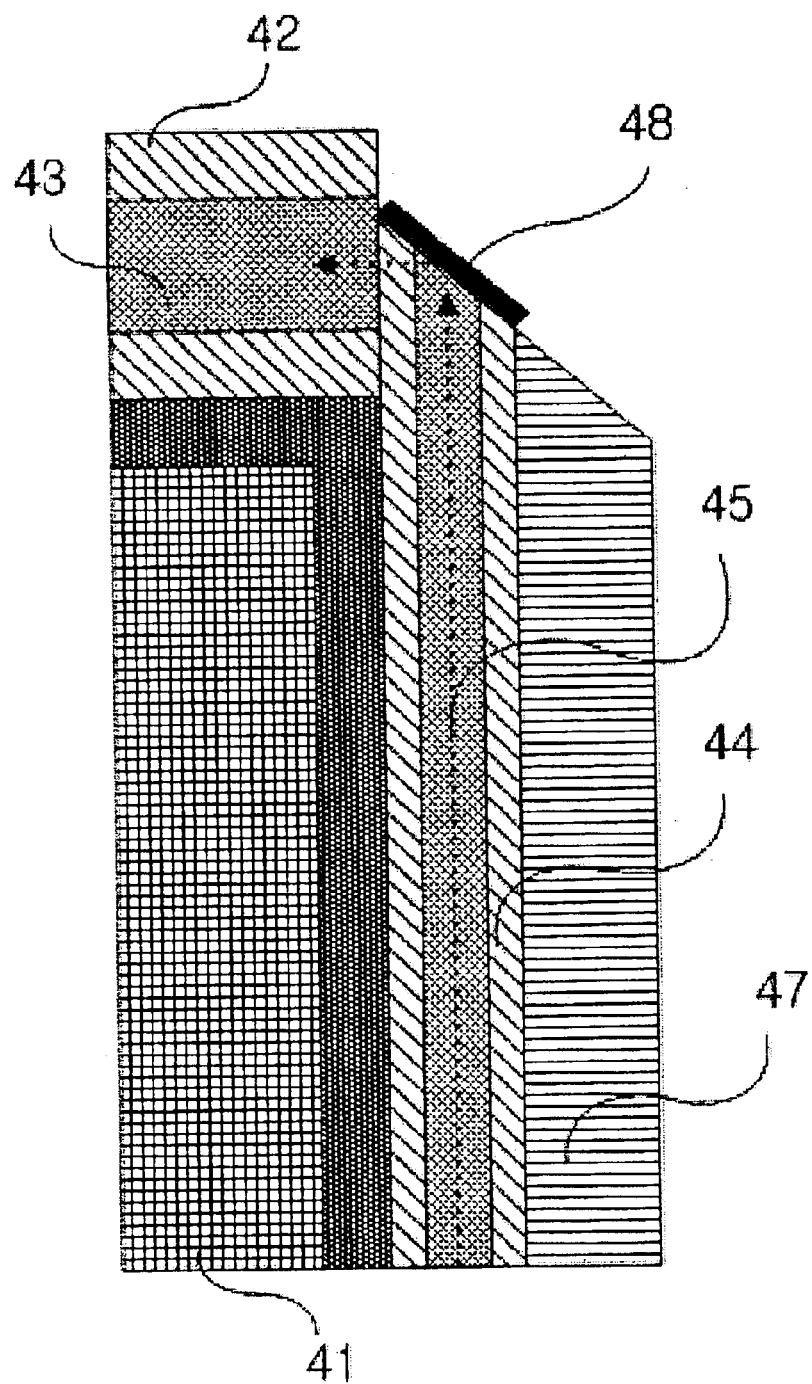
FIG. 11 is a sectional view of a multi-layer PCB in which the optical waveguide and the optical signal coupling block are interconnected using the beam reflection coupling method according to a fifth embodiment of the present invention.

FIG. 11 is a sectional view of a multi-layer PCB in which the optical waveguide and the optical signal coupling block are interconnected using the beam reflection coupling method according to a fifth embodiment of the present invention.

Referring to FIG. 11, in the method for interconnecting the optical signal coupling fiber block to the optical waveguide of the multi-layer PCB according to the fifth embodiment of the present invention, the optical fiber 44 is inserted into an optical signal coupling block in which V-shaped grooves are formed only in the lower block 47.

Thereafter, the optical waveguide 42 and 43 is cut at an angle of 90°, the optical signal coupling fiber block is cut at an angle of 45°, and the surface of the optical fiber 44 cut at an angle of 45° is polished to form a reflection surface.

Next, the reflection mirror 48 is attached to the reflection surface, and the positions of the optical waveguide 42 and 43 and the optical signal coupling fiber block are aligned. In this case, the reason for attaching the reflection mirror 48 after the reflection surface is formed is to increase light transmission efficiency.

Further, in order to fix the optical signal coupling fiber block to the PCB insulation material, the fiber block can be adhered to the PCB insulation material using epoxy after the position alignment is carried out.

Moreover, the optical signal coupling fiber block can be replaced with the pipe block, and the optical fiber can be a glass fiber and replaced with an optical waveguide.

In this case, the reflection mirror can be a micro mirror coated with silver Ag or aluminum Al.

Sixth Embodiment

Figure 12:
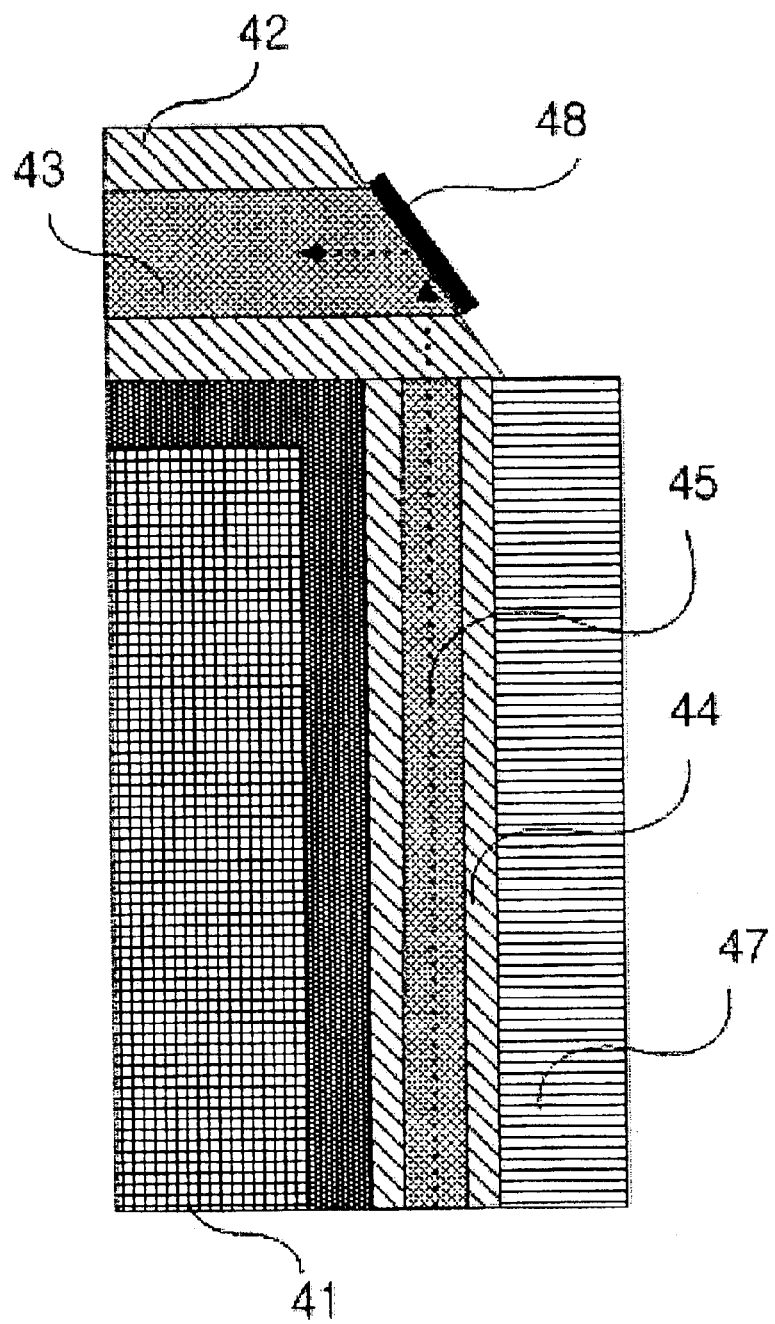
FIG. 12 is a sectional view of a multi-layer PCB in which the optical waveguide and the optical signal coupling block are interconnected using the beam reflection coupling method according to a sixth embodiment of the present invention.

FIG. 12 is a sectional view of a multi-layer PCB in which the optical waveguide and the optical signal coupling block are interconnected using the beam reflection coupling method according to a sixth embodiment of the present invention.

Referring to FIG. 12, in the method for connecting the optical signal coupling block to the optical waveguide of the multi-layer PCB according to the sixth embodiment of the present invention, the optical fiber 44 is inserted into an optical signal coupling block in which V-shaped grooves are formed only in the lower block 47, the optical waveguide 42 and 43 is cut at an angle of 45°, and the optical signal coupling block is cut at an angle of 90°.

Next, a surface formed by cutting the optical waveguide 42 and 43 at an angle of 45° is polished to form a reflection surface, the reflection mirror 48 is attached to the reflection surface, and then the positions of the optical waveguide and the optical signal coupling block are aligned. In this case, the reason for attaching the reflection mirror 48 after the reflection surface is formed is to increase light transmission efficiency.

Further, in order to fix the optical signal coupling fiber block to a side of the PCB insulation material, the fiber block can be adhered to the PCB insulation material using epoxy after the position alignment is carried out.

Moreover, the optical signal coupling fiber block can be replaced with the pipe block, and the optical fiber 44 can be a glass fiber and replaced with an optical waveguide.

In this case, the reflection mirror can be a micro mirror coated with silver Ag or aluminum Al.

The optical signal coupling fiber block is adhered to the PCB insulation material such that the optical fiber 44 inserted into each V-shaped groove formed on the lower block 47 comes into contact with a surface of the optical via hole.

Seventh Embodiment

Figure 13:
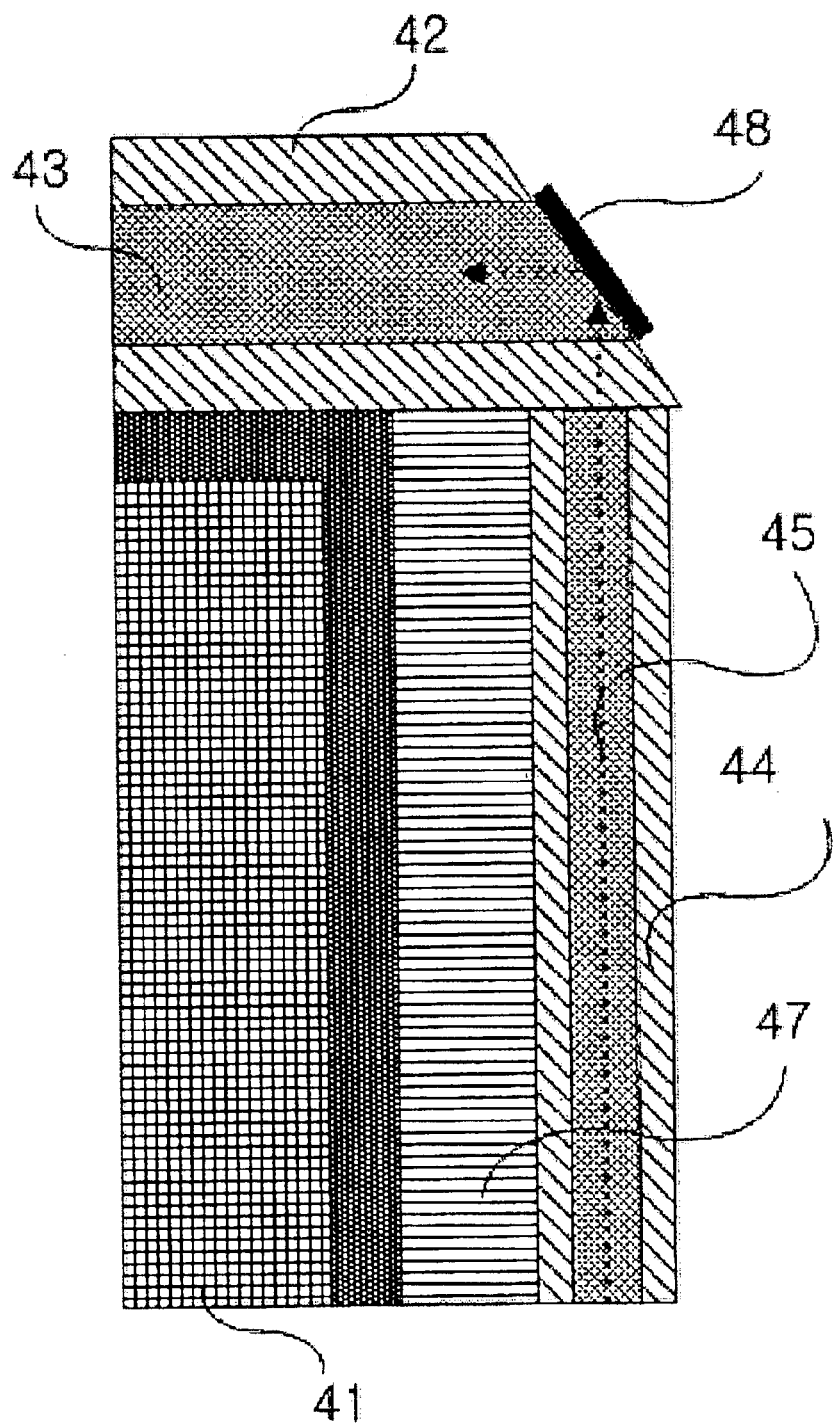
FIG. 13 is a sectional view of a multi-layer PCB in which the optical waveguide and the optical signal coupling block are interconnected using the beam reflection coupling method according to a seventh embodiment of the present invention.

FIG. 13 is a sectional view of a multi-layer PCB in which the optical waveguide and the optical signal coupling block are interconnected using the beam reflection coupling method according to a seventh embodiment of the present invention.

Referring to FIG. 13, the method for interconnecting the optical signal coupling block to the optical waveguide of the multi-layer PCB according to the seventh embodiment of the present invention is the same as the sixth embodiment, except that the optical signal coupling fiber block is adhered to the PCB insulation material to allow the lower block 47 to come into contact with a surface of the optical via hole.

That is, the optical signal coupling fiber block is reversely oriented with respect to the sixth embodiment, and adhered to the PCB insulation material so as to enlarge a contact surface between the optical waveguide 42 and 43 and the fiber block. Therefore, the contact surface therebetween is enlarged, thus increasing the stability of the multi-layer PCB.

Further, when the fiber block is adhered to the PCB insulation material in this manner, an adhesive material must be prevented from permeating into a space between the fiber block and the optical waveguide 42 and 43.

Further, the optical signal coupling fiber block can be replaced with the pipe block, and the optical fiber can be a glass fiber and replaced with an optical waveguide.

Meanwhile, FIGS. 14a to 14e are views showing a method of manufacturing the fiber block according to the present invention.

The above-described fiber block, for example, a fiber block in which optical fibers 62 are inserted only into a lower block 61 without an upper block, can be manufactured by the following process.

Figure 14A:
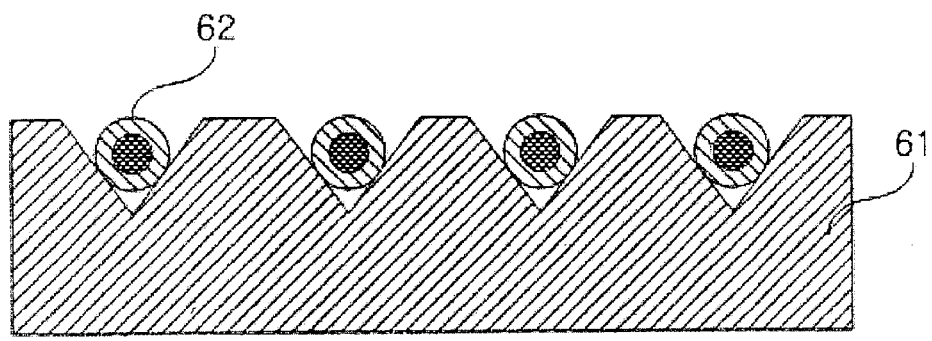
FIGS. 14a to 14e are views showing a process of attaching the fiber block of the present invention to the optical waveguide.

First, a silicon wafer 61 is etched to allow a plurality of V-shaped grooves to be formed therein, and the optical fibers 62 are inserted into the V-shaped grooves as shown in FIG. 14a.

Figure 14B:
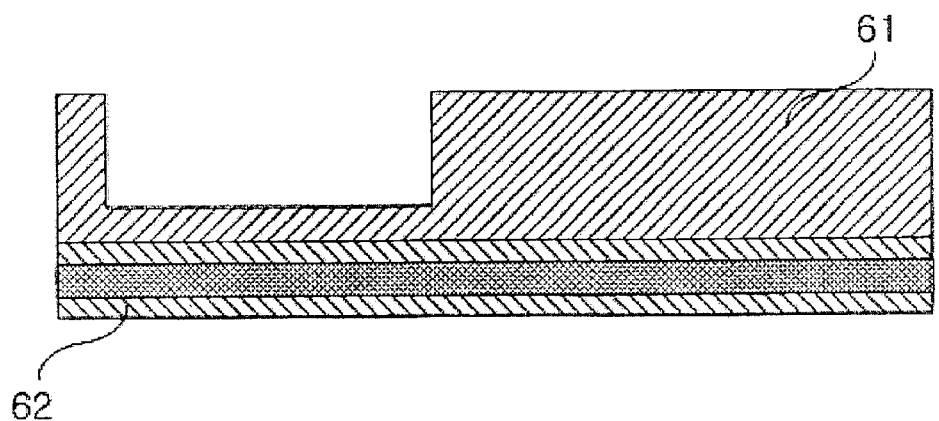

Next, as shown in FIG. 14b, a groove is formed on a surface of the silicon wafer 61 which is opposite to a surface in which the V-shaped grooves are formed, wherein a reflection surface of 45° will be formed on the opposite surface. In this case, an inverted side sectional view of the fiber block of FIG. 14a is depicted in FIG. 4b for convenience of description.

Figure 14C:
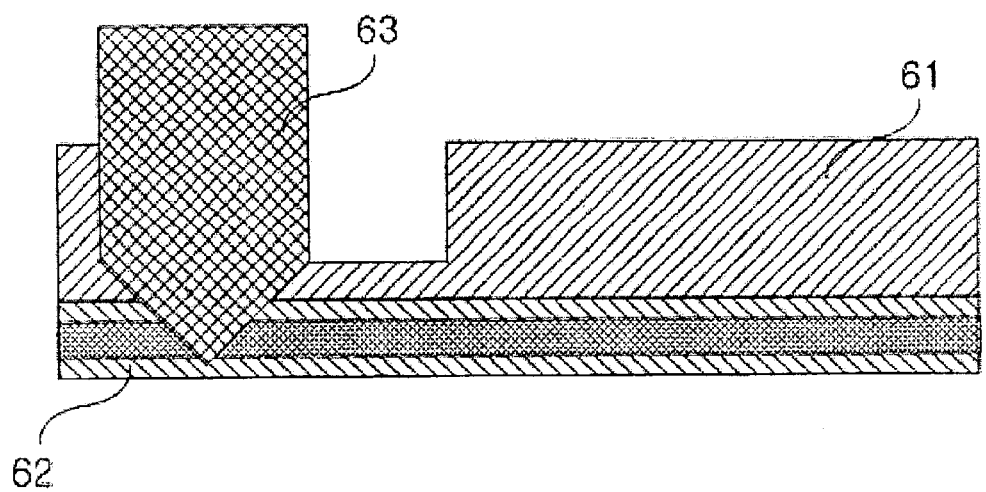

After that, the formed groove is cut at an angle of 45° using a diamond blade 63, as shown in FIG. 14c. Generally, the diamond blade 63 can be most easily applied to a cutting operation of 45°.

Figure 14D:
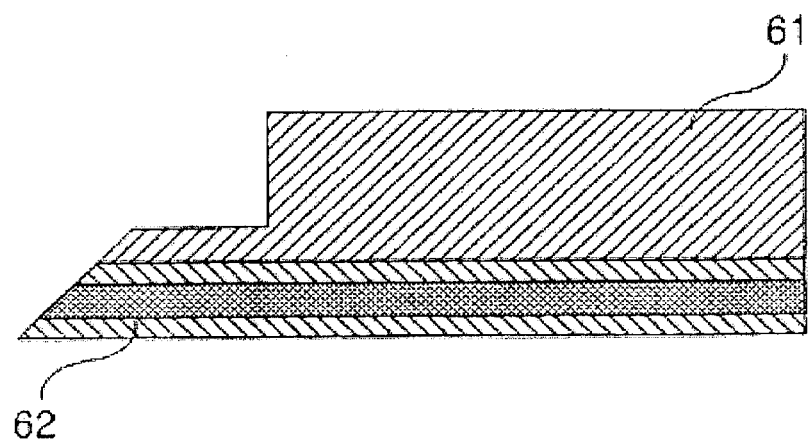
Figure 14E:
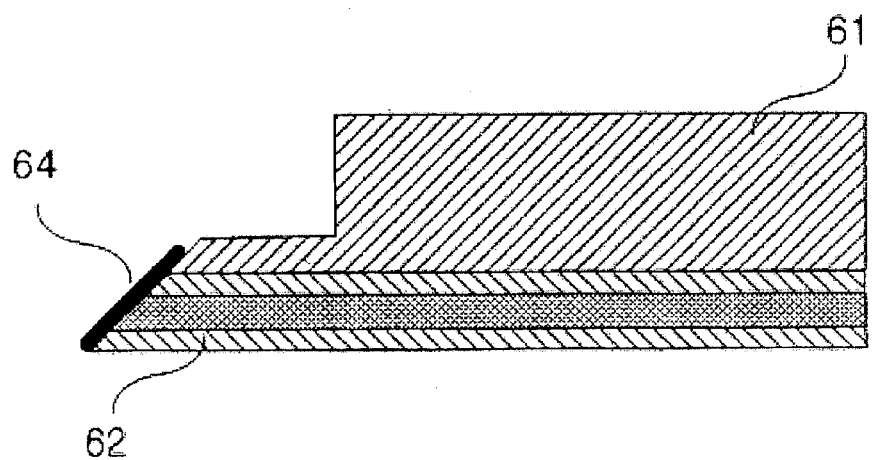

Next, a surface cut at an angle of 45° is polished to form a reflection surface, as shown in FIG. 14d, and a reflection mirror 64 can be attached to the reflection surface, as shown in FIG. 14e.

Consequently, through the above method, the fiber block is appropriately modified according to shapes required in the first to seventh embodiments, such that an appropriate optical signal coupling fiber block can be manufactured.

Meanwhile, FIGS. 15a to 15f are views showing a process of manufacturing an optical waveguide which can be substituted for the fiber block of the present invention.

Figure 15A:
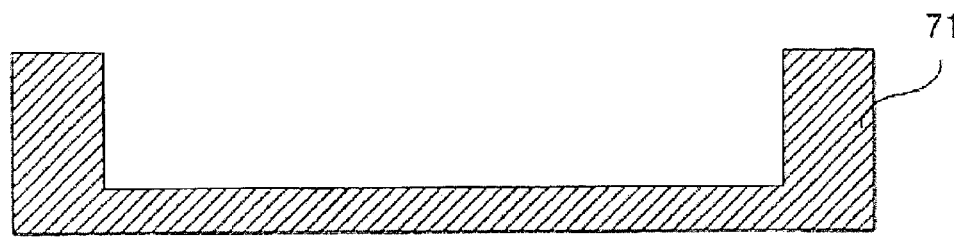
FIGS. 15a to 15f are views showing a process of attaching the pipe block of the present invention to the optical waveguide.
Figure 15B:
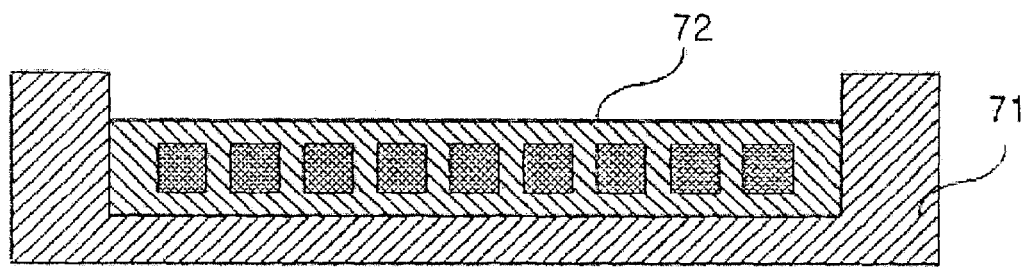

First, a silicon wafer 71 is etched to allow a groove to be formed therein, as shown in FIG. 15a. Next, an optical waveguide 72 is inserted into the groove instead of the fiber block, and then adhered to the silicon wafer 71 using epoxy resin, as shown in FIG. 15b. In this case, the epoxy resin is preferably ultraviolet (UV) curable epoxy resin.

Figure 15C:
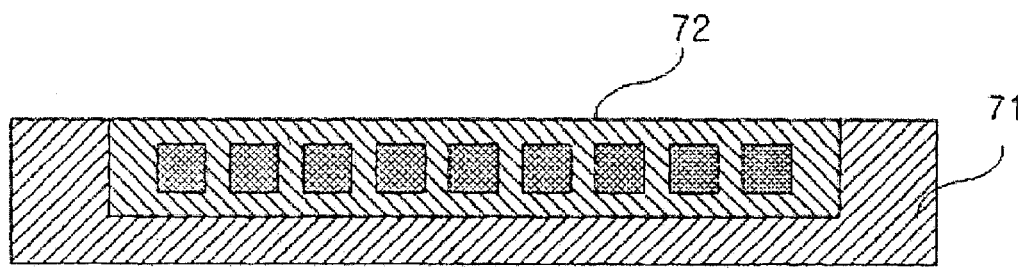

Next, edge portions of the silicon wafer 71 are cut after the optical waveguide 72 is inserted into the groove, as shown in FIG. 15c.

Figure 15D:
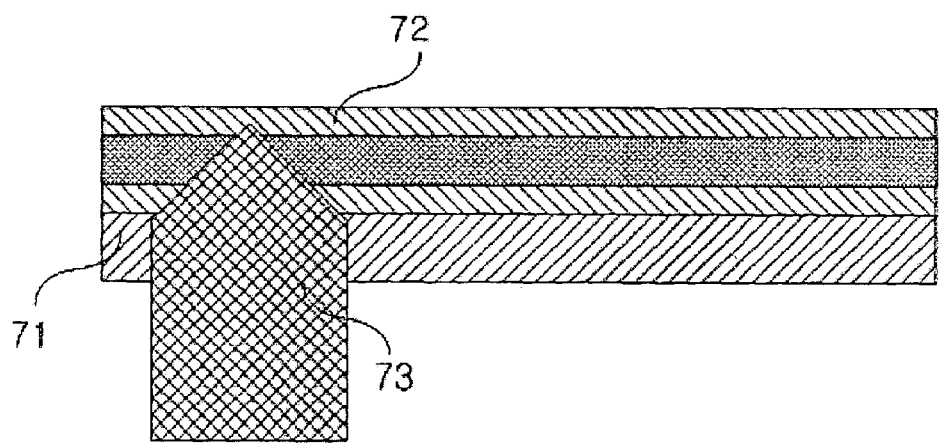

At this time, if an optical signal coupling direction is a direction from the optical waveguide 72 to the silicon wafer 71, an end portion of the optical waveguide 72 is cut an angle of 45° using a diamond blade 73 approaching from the silicon wafer 71 side, as shown in FIG. 15d.

Figure 15E:
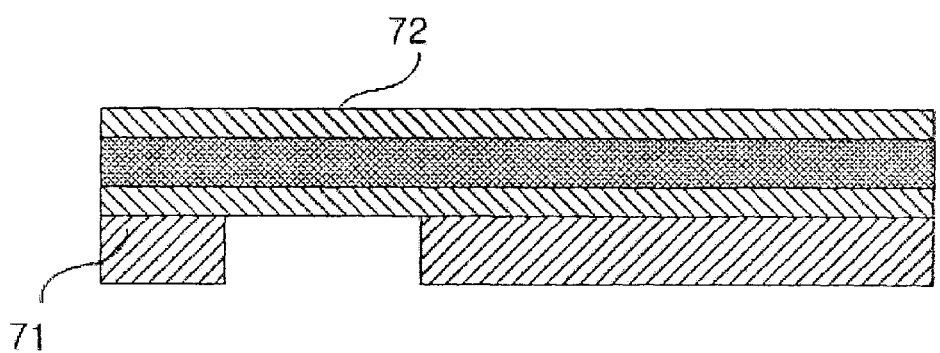
Figure 15F:
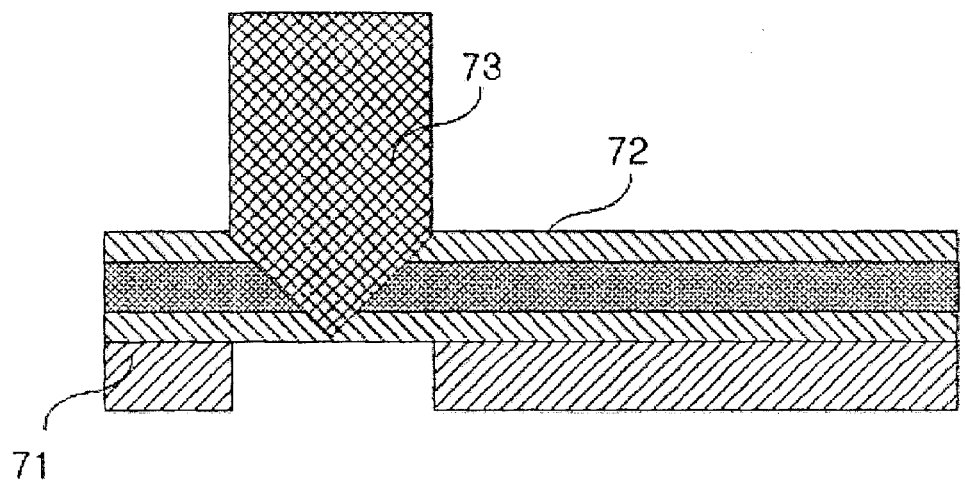

Further, if an optical signal coupling direction is toward the optical waveguide 72, the procedures of FIGS. 15e and 15f can be carried out, after the procedures of FIGS. 15a to 15c are executed.

Referring to FIG. 15e, if the optical signal coupling direction is a direction from the silicon wafer 71 to the optical waveguide 72, the silicon wafer 71 is etched to allow a groove to be formed therein, and the optical waveguide 72 is then cut using the diamond blade 73 approaching from the optical waveguide 72 side, as shown in FIG. 15f.

Meanwhile, FIGS. 16a to 16d are views showing a process of forming the pipe block of the present invention. That is, FIGS. 16a to 16d illustrate a process of manufacturing the pipe block which can be used instead of the fiber block in the above embodiments.

Figure 16A:
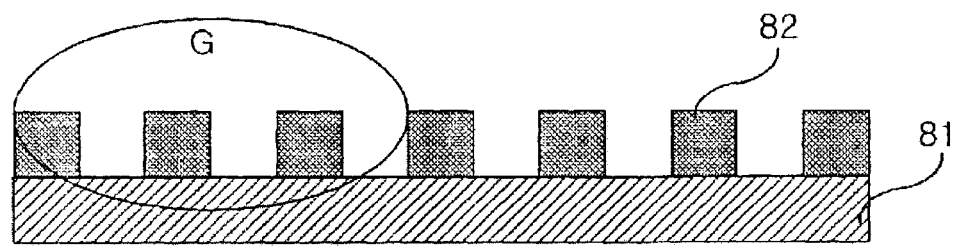
FIGS. 16a to 16d are views showing a process of forming the pipe block of the present invention.

In the pipe block for optical signal coupling according to the present invention, a core 82 defining a plurality of pipe-shaped grooves formed at regular intervals, for example, through a laser ion etching process, is formed on an under-cladding 81 made of a medium for optical waveguides, as shown in FIG. 16a.

Figure 16B:
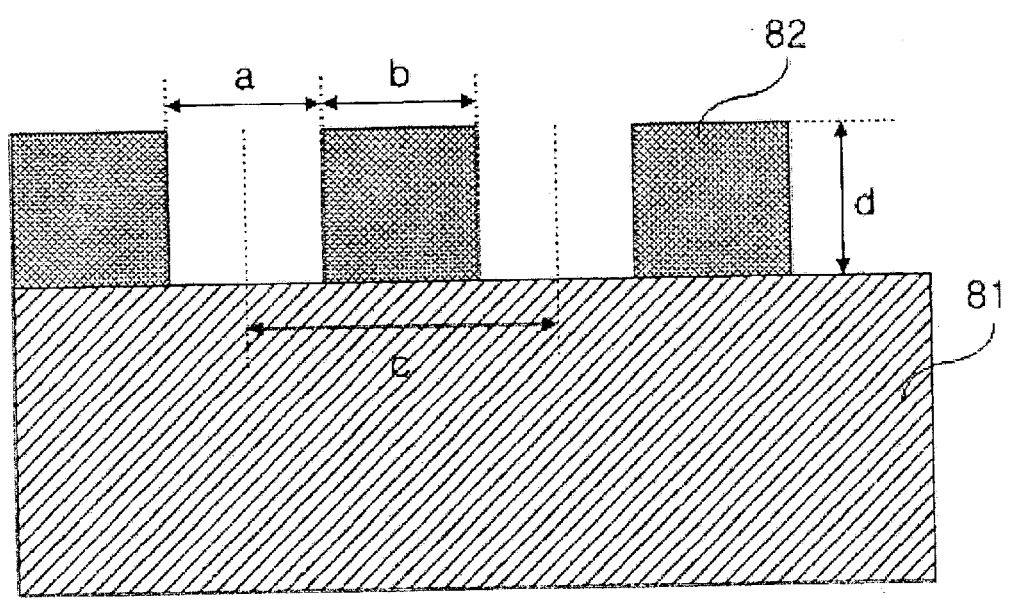

FIG. 16b is a detailed view showing a part designated by "G" in FIG. 16a. The pipe block can be manufactured such that the lengths of both "a" and "b" are 125 $\mu$m, the length of "c" is 250 $\mu$m, and the height of "d" is 100 to 125 $\mu$m. In this case, the length of a core member "b" and the length of the groove "a" may be equally set to 125 $\mu$m.

Figure 16C:
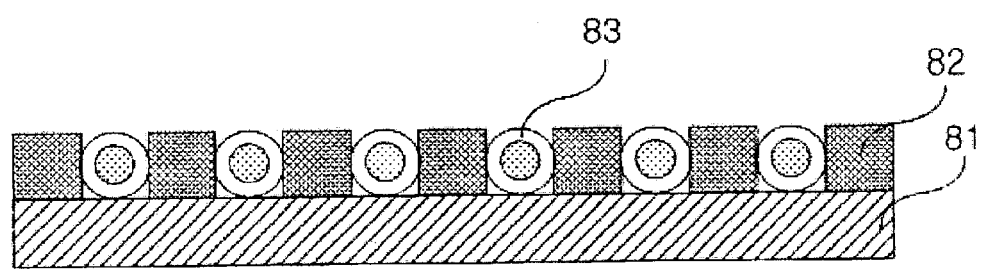
Figure 16D:
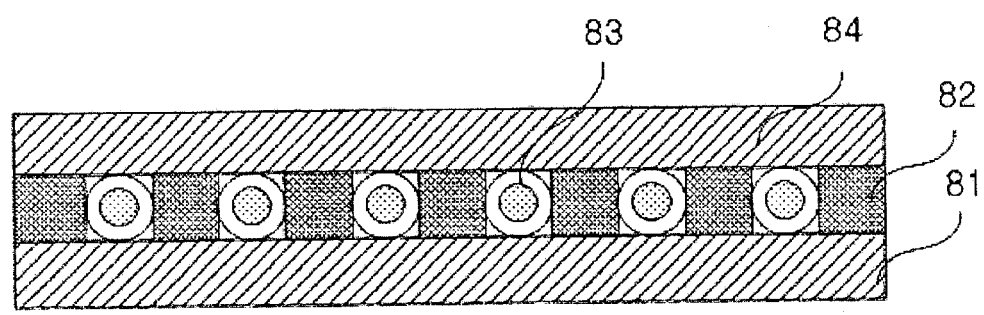

Next, a plurality of optical fibers 83 are inserted into the plural grooves, as shown in FIG. 16c, and after that an over-cladding 84 is formed on the optical fibers 83, as shown in FIG. 16d, thus completing the manufacture of the pipe block.

Consequently, in order to couple optical signals between layers in the case that an optical PCB is formed in multiple layers, the present invention is constructed such that Plastic Optical Fibers (POFs) are inserted into fiber blocks or pipe blocks having grooves formed in a predetermined shape, and the fiber blocks or pipe blocks are inserted into optical via holes or cavities in the PCB. Therefore, optical waveguides and optical fibers are connected to each other through optical signals, thus enabling optical signals between respective layers of the multi-layer PCB to be coupled.

As described above, the present invention provides a method for coupling optical signals between layers in a multi-layer PCB, which can transmit an optical signal over a long distance without using a conventional micro lens.

Further, the present invention is advantageous in that alignment characteristics of a multi-layer PCB can be improved and optical signal coupling between layers of the multi-layer PCB can be easily performed.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A method for coupling optical signals between layers of a multi-layer printed circuit board (PCB) using optical signal coupling blocks, comprising the steps of:

forming a plurality of optical via holes in the multi-layer PCB to which optical waveguides for transmitting optical signals are attached;

inserting the optical signal coupling blocks into the plural optical via holes such that the optical signal coupling blocks are connected to the optical waveguides to transmit the optical signals;

forming at least one connection part to couple optical signals between the optical waveguides and the optical signal coupling blocks; and interconnecting the optical waveguides and the optical signal coupling blocks by aligning positions of the optical waveguides and the optical signal coupling blocks.

2. The optical signal coupling method according to claim 1, wherein said connection part is constructed such that a surface cut at an angle of 45° is formed thereon, thus enabling the optical waveguides and the optical signal coupling blocks to be interconnected in an "L" or an inverted and reversed "L" shape through the cut surface.

3. The optical signal coupling method according to claim 1, wherein said connection part includes a reflection mirror attached thereto.

4. The optical signal coupling method according to claim 1, wherein said optical signal coupling blocks are fiber blocks each comprising;
   a lower block provided with a plurality of grooves formed at regular intervals and each having a certain shape; and
   a plurality of optical signal coupling members inserted into the plural grooves.

5. The optical signal coupling method according to claim 4, wherein said grooves are V-shaped.

6. The optical signal coupling method according to claim 4, wherein each of the fiber blocks further comprises an upper block formed on the optical signal coupling members.

7. The optical signal coupling method according to claim 1, wherein said optical signal coupling blocks are pipe blocks each comprising;
   an under-cladding formed of a medium for optical waveguides;
   a core defining a plurality of grooves formed in a pipe shape at regular intervals on the under-cladding;
   a plurality of optical signal coupling members inserted into the plural grooves; and
   an over-cladding formed on the optical signal coupling members.

8. The optical signal coupling method according to claim 1, wherein said optical signal coupling blocks are constructed such that their optical signal input terminals are arranged within a distance of 60 $\mu$m from Vertical-Cavity Surface-Emitting Lasers (VCSELs), so that the VCSELs radiate light to the optical signal coupling blocks.

9. The optical signal coupling method according to claim 4 or 7, wherein said optical signal coupling members are optical fibers or optical waveguides.

10. The optical signal coupling method according to claim 2, wherein said surface cut at an angle of 45° is polished.

11. The optical signal coupling method according to claim 2, wherein said connection part is constructed such that each of th/e optical waveguides is cut at an angle of 45°, and each of the optical signal coupling blocks is cut at an angle of 90° so as to interconnect the optical waveguides and the optical signal coupling blocks through optical signals.

12. The optical signal coupling method according to claim 1, further comprising the step of adhering the optical signal coupling blocks to the multi-layer PCB using epoxy so as to fix the optical signal coupling blocks to the multi-layer PCB after the aligning of positions is performed.

13. A method for interconnecting optical signal coupling blocks and optical waveguides, comprising the steps of:
   inserting optical signal coupling members into two optical signal coupling blocks which will be interconnected through optical signals;
   etching one of the two optical signal coupling blocks at an angle of 45°;
   polishing the portion etched at an angle of 45°;
   joining the two optical signal coupling blocks together to form an L-shaped optical signal coupling block; and
   connecting the L-shaped optical signal coupling block to each of the optical waveguides by aligning positions of the L-shaped optical signal coupling block and the optical waveguide such that the L-shaped optical signal coupling block is interconnected to the optical waveguide through optical signals.

14. The method for interconnecting optical signal coupling blocks and optical waveguides according to claim 13, wherein a reflection mirror is attached to said polished portion.

15. The method for interconnecting optical signal coupling blocks and optical waveguides according to claim 13, further comprising the step of adhering the L-shaped optical signal coupling block to a multi-layer PCB using epoxy so as to fix the L-shaped optical signal coupling block to the multi-layer PCB after the aligning of positions is performed.

16. The method for interconnecting optical signal coupling blocks and optical waveguides according to claim 13, wherein said optical signal coupling members are optical fibers or optical waveguides.

17. A method for interconnecting optical signal coupling blocks and optical waveguides, comprising the steps of:
   a) inserting optical signal coupling members into at least one optical signal coupling block in which V-shaped grooves are formed in only a lower block;
   b) cutting each of the optical waveguides at an angle of 90° and cutting the optical signal coupling block at an angle of 45° such that the optical waveguide and the optical signal coupling block are interconnected through optical signals;
   c) polishing a surface formed by cutting the optical signal coupling block at an angle of 45° to form a reflection surface; and
   d) aligning positions of the optical waveguide and the optical signal coupling block.

18. The method for interconnecting optical signal coupling blocks and optical waveguides according to claim 17, wherein a reflection mirror is attached to said reflection surface.

19. The method for interconnecting optical signal coupling blocks and optical waveguides according to claim 17, further comprising the step of adhering the optical signal coupling block to a multi-layer PCB using epoxy so as to fix the optical signal coupling block to the multi-layer PCB after the aligning of positions is performed.

20. The method for interconnecting optical signal coupling blocks and optical waveguides according to claim 17, wherein said optical signal coupling members are optical fibers or optical waveguides.

21. The method for interconnecting optical signal coupling blocks and optical waveguides according to claim 17, wherein said reflection mirror is a micro mirror coated with silver (Ag) or aluminum (Al).

22. The method for interconnecting optical signal coupling blocks and optical waveguides according to claim 17, wherein the step a) comprises the steps of:
   forming the plural V-shaped grooves by etching a silicon wafer;
   inserting the optical fiber into the V-shaped grooves; and
   forming a groove at a surface of the silicon wafer which is opposite to a surface in which the V-shaped grooves are formed, wherein the reflection surface of 45° is formed on the opposite surface.

23. The method for interconnecting optical signal coupling blocks and optical waveguides according to claim 17, wherein the step b) is performed such that the optical signal coupling block is cut at an angle of 45° using a diamond blade.

24. A method for interconnecting optical signal coupling blocks and optical waveguides, comprising the steps of:
   a) inserting optical signal coupling members into at least one optical signal coupling block in which V-shaped grooves are formed in only a lower block;
   b) cutting each of the optical waveguides at an angle of 45° and cutting the optical signal coupling block at an angle of 90 ° such that the optical waveguide and the optical signal coupling block are interconnected through optical signals;

c) polishing a surface formed by cutting the optical waveguide at an angle of 45° to form a reflection surface; and d) aligning positions of the optical waveguide and the optical signal coupling block.

25. The method for interconnecting optical signal coupling blocks and optical waveguides according to claim 24, wherein a reflection mirror is attached to said reflection surface.

26. The method for interconnecting optical signal coupling blocks and optical waveguides according to claim 24, further comprising the step of adhering the optical signal coupling block to a multi-layer PCB using epoxy so as to fix the optical signal coupling block to the multi-layer PCB after the aligning of positions is performed.

27. The method for interconnecting optical signal coupling blocks and optical waveguides according to claim 24, wherein said optical signal coupling members are optical fibers or optical waveguides.

28. The method for interconnecting optical signal coupling blocks and optical waveguides according to claim 24, wherein said reflection mirror is a micro mirror coated with silver (Ag) or aluminum (Al).

29. The method for interconnecting optical signal coupling blocks and optical waveguides according to claim 24, wherein the step a) comprises the steps of:

forming the plural V-shaped grooves by etching a silicon wafer;

inserting the optical signal coupling members into the V-shaped grooves; and forming a groove on a surface of the silicon wafer which is opposite to a surface in which the V-shaped grooves are formed, wherein the reflection surface of 45° is formed on the opposite surface.

30. The method for interconnecting optical signal coupling blocks and optical waveguides according to claim 24, wherein the step b) is performed such that the optical waveguide is cut at an angle of 45° using a diamond blade.

31. The method for interconnecting optical signal coupling blocks and optical waveguides according to claim 24, wherein said optical signal coupling block is adhered to a multi-layer PCB such that the optical signal coupling members inserted into the V-shaped grooves in the lower block come into contact with a surface of each of optical via holes in the multi-layer PCB.

32. The method for interconnecting optical signal coupling blocks and optical waveguides according to claim 24, wherein said optical signal coupling block is adhered to a multi-layer PCB such that the lower block comes into contact with a surface of each of optical via holes in the multi-layer PCB.

33. A method for forming optical waveguide devices in an optical signal coupling block, comprising the steps of:

a) forming a groove by etching a silicon wafer of the optical signal coupling block;

b) inserting optical waveguide devices into the groove and adhering the optical waveguide devices to the silicon wafer using epoxy resin;

c) cutting edge portions of the silicon wafer, protruded from surfaces of the inserted optical waveguide devices; and d) cutting end portions of the optical waveguide devices at an angle of 45° according to an optical signal coupling direction.

34. The method for forming optical waveguide devices in an optical signal coupling block according to claim 33, wherein the step d) is performed such that, if the optical signal coupling direction is a direction from the optical waveguide devices to the silicon wafer, the end portions of the optical waveguide devices are cut using a diamond blade approaching from the silicon wafer side.

35. The method for forming optical waveguide devices in an optical signal coupling block according to claim 33, wherein the step d) is performed such that, if the optical signal coupling direction is a direction from the silicon wafer to the optical waveguide devices, the silicon wafer is etched to form a groove and then the end portions of the optical waveguide devices are cut using a diamond blade approaching from the optical waveguide devices side.

36. The method for forming optical waveguide devices in an optical signal coupling block according to claim 33, wherein said epoxy resin is ultraviolet (UV) curable epoxy resin.

37. A printed circuit board (PCB) for coupling optical signals between layers using optical signal coupling blocks, comprising:

a base board having a plurality of optical via holes;

a plurality of optical waveguides mounted on the base board to transmit optical signals;

a plurality of optical signal coupling blocks inserted into the plural optical via holes and connected to the plural optical waveguides to transmit optical signals; and at least one connection part for interconnecting the optical waveguides and the optical signal coupling blocks.

38. The printed circuit board according to claim 37, wherein said connection part is constructed such that a surface cut at an angle of 45° is formed thereon, thus enabling the optical waveguides and the optical signal coupling blocks to be interconnected in an "L" or an inverted and reversed "L" shape through the cut surface.

39. The printed circuit board according to claim 37, wherein said connection part includes a reflection mirror attached thereto, thus enabling the optical waveguides and the optical signal coupling blocks to be interconnected in an "L" or an inverted and reversed "L" shape through the cut surface.

40. The printed circuit board according to claim 37, wherein said optical signal coupling blocks are fiber blocks each comprising:

a lower block provided with a plurality of grooves formed at regular intervals and each having a certain shape; and a plurality of optical signal coupling members inserted into the plural grooves.

41. The printed circuit board according to claim 40, wherein said grooves are V-shaped.

42. The printed circuit board according to claim 40, wherein each of the fiber blocks further comprises an upper block formed on the optical signal coupling members.

43. The printed circuit board according to claim 37, wherein said optical signal coupling blocks are pipe blocks each comprising;

an under-cladding formed of a medium for optical waveguides;

a core defining a plurality of grooves formed in a pipe shape at regular intervals on the under-cladding;

a plurality of optical signal coupling members inserted into the plural grooves; and an over-cladding formed on the optical signal coupling members.

44. The printed circuit board according to claim 37, wherein said optical signal coupling blocks are constructed such that their optical signal input terminals are arranged within a distance of 60 µm from Vertical-Cavity Surface-Emitting Lasers (VCSELs), so that the VCSELs radiate light to the optical signal coupling blocks.

45. The printed circuit board according to claim 40 or 43, wherein said optical signal coupling members are optical fibers or optical waveguides.

46. The printed circuit board according to claim 38, wherein said surface cut at an angle of 45° is polished.

47. The printed circuit board according to claim 38, wherein said connection part is constructed such that each of the optical waveguides is cut at an angle of 45°, and each of the optical signal coupling blocks is cut at an angle of 90° so as to interconnect the optical waveguides and the optical signal coupling blocks through optical signals.

48. The printed circuit board according to claim 37, wherein said optical signal coupling blocks are adhered to the printed circuit board using epoxy so as to fix the optical signal coupling blocks to the printed circuit board after the aligning of positions is performed.

49. A printed circuit board (PCB) for coupling optical signals between layers using optical signal coupling blocks, comprising:
a base board having a plurality of optical via holes;
a plurality of optical waveguides mounted on to the base board to transmit optical signals; and
a plurality of optical signal coupling blocks each having a plurality of optical signal coupling members inserted thereinto such that the optical signal coupling blocks and the optical waveguides are interconnected through optical signals,
wherein each of the optical signal coupling blocks is comprised of two optical signal coupling blocks joined together in an "L" (elbow) shape, any of two optical signal coupling blocks being etched at an angle of 45° and polished.

50. A printed circuit board for coupling optical signals between layers using optical signal coupling blocks, comprising:
a base board having a plurality of optical via holes;
a plurality of optical waveguides mounted on the base board to transmit optical signals; and
a plurality of optical signal coupling blocks each having a plurality of V-shaped grooves formed only in a lower block,
wherein each of the optical waveguides is cut at an angle of 90° and each of the optical signal coupling blocks is cut at an angle of 45° such that the optical waveguides and the optical signal coupling blocks are interconnected through optical signals, and a surface formed by cutting each of the optical signal coupling blocks at an angle of 45° is polished to form a reflection surface.

51. A printed circuit board for coupling optical signals between layers using optical signal coupling blocks, comprising:
a base board having a plurality of optical via holes;
a plurality of optical waveguides mounted on the base board to transmit optical signals; and
a plurality of optical signal coupling blocks each having a plurality of V-shaped grooves formed only in a lower block,
wherein each of the optical waveguides is cut at an angle of 45° and each of the optical signal coupling blocks is cut at an angle of 90° such that the optical waveguides and the optical signal coupling blocks are interconnected through optical signals, and a surface formed by cutting each of the optical waveguides at an angle of 45° is polished to form a reflection surface.

52. An optical signal coupling block, comprising:
a lower block in which a plurality of grooves each having a certain shape are formed at regular intervals; and
a plurality of optical signal coupling members inserted into the plural grooves.

53. The optical signal coupling block according to claim 52, wherein the certain shape is a "V" shape.

54. The optical signal coupling block according to claim 52, wherein said lower block is a silicon wafer.

55. The optical signal coupling block according to claim 52, wherein said grooves each having the certain shape are formed by laser ion etching.

56. The optical signal coupling block according to claim 52, wherein said optical signal coupling members are optical fibers.

57. The optical signal coupling block according to claim 56, wherein said optical fibers are plastic optical fibers.

58. The optical signal coupling block according to claim 52, wherein said optical signal coupling members are optical waveguides.

59. The optical signal coupling block according to claim 52, further comprising an upper block formed on the optical signal coupling members.

60. The optical signal coupling block according to claim 59, wherein said upper block is made of Pyrax glass having a light transmissivity equal to or greater than 95%.

61. The optical signal coupling block according to claim 59, wherein said upper block is made of a polymer.

62. The optical signal coupling block according to claim 59, wherein said upper block has the same grooves as those in the lower block.

63. The optical signal coupling block according to claim 52, wherein said optical signal coupling members are cut at an angle of 45 or 90°, such that the optical signal coupling block and an optical waveguide are interconnected in an "L" or an inverted and reversed "L" shape.

64. An optical signal coupling block, comprising:
an under-cladding formed of a medium for optical waveguides;
a core defining a plurality of grooves formed in a certain shape at regular intervals on the under-cladding;
a plurality of optical signal coupling members inserted into the plural grooves; and
an over-cladding formed on the optical signal coupling members.

65. The optical signal coupling block according to claim 64, wherein the certain shape is a pipe shape.

66. The optical signal coupling block according to claim 64, wherein said core is made of a polymer and functions as a guide for supporting the optical signal coupling members.

67. The optical signal coupling block according to claim 64, wherein said plural grooves are formed by laser ion etching.

68. The optical signal coupling block according to claim 64, wherein said optical signal coupling members are optical fibers.

69. The optical signal coupling block according to claim 68, wherein said optical fibers are plastic optical fibers.

70. The optical signal coupling block according to claim 64, wherein said over-cladding is made of Pyrax glass having a light transmissivity equal to or greater than 95%.

71. The optical signal coupling block according to claim 64, wherein said over-cladding is made of a polymer.

72. The optical signal coupling block according to claim 64, wherein said optical signal coupling members are cut at an angle of 45 or 90°, such that the optical signal coupling block and an optical waveguide are interconnected in an "L" or an inverted and reversed "L" shape.

73. A method for coupling optical signals between layers of a multi-layer printed circuit board (PCB) using optical signal coupling blocks, said layers being parallel to each other and having optical waveguides attached thereto, comprising the steps of:

forming a plurality of optical via holes in the multi-layer PCB;

inserting the optical signal coupling blocks into the plural optical via holes;

forming at least one connection part to couple optical signals between the optical waveguides and the optical signal coupling blocks; and interconnecting the optical waveguides and the optical signal coupling blocks by aligning positions of the optical waveguides and the optical signal coupling blocks to transmit optical signals between said waveguides and said optical signal coupling blocks.

74. A method for coupling optical signals between layers of a multi-layer printed circuit board (PCB) using optical signal coupling blocks, comprising the steps of:

forming a plurality of optical via holes in the multi-layer PCB to which optical waveguides for transmitting optical signals are attached;

inserting the optical signal coupling blocks into the plural optical via holes such that the optical signal coupling blocks are connected to the optical waveguides to transmit the optical signals;

forming at least one connection part to couple optical signals between the optical waveguides and the optical signal coupling blocks; and interconnecting the optical waveguides and the optical signal coupling blocks by aligning positions of the optical waveguides and the optical signal coupling blocks;

wherein said optical signal coupling blocks are fiber blocks each comprising;

a lower block provided with a plurality of grooves formed at regular intervals and each having a certain shape; and a plurality of optical signal coupling members inserted into the plural grooves.

* * * * *